United States Patent [19]

Motoc

[11] Patent Number: 5,768,122
[45] Date of Patent: Jun. 16, 1998

[54] VIRTUAL MOTION PROGRAMMING AND CONTROL

[75] Inventor: Bogdan Motoc, Toronto, Canada

[73] Assignee: Coard Technology, Simi Valley, Calif.

[21] Appl. No.: 557,308

[22] Filed: Nov. 14, 1995

[51] Int. Cl.$^6$ .................... A63G 31/08; A63G 31/10; G09B 9/02

[52] U.S. Cl. .................... 364/148; 364/174; 364/147; 395/1; 395/3; 395/61; 395/77

[58] Field of Search .................... 434/55, 58, 59, 434/69, 34, 43, 44, 45; 364/147, 424.049, 174, 178, 167.01, 426.022, 578; 318/571, 632; 345/164, 157; 395/349, 3, 61, 77

[56] References Cited

U.S. PATENT DOCUMENTS

| | | |
|---|---|---|
| 4,030,207 | 6/1977 | Kron . |
| 4,066,256 | 1/1978 | Trumbull . |
| 4,418,911 | 12/1983 | Bowers et al. . |
| 4,456,093 | 6/1984 | Finley et al. . |
| 4,505,472 | 3/1985 | Lorenc et al. . |
| 4,710,129 | 12/1987 | Newman et al. . |
| 4,751,662 | 6/1988 | Crosbie . |
| 4,752,065 | 6/1988 | Trumbull et al. . |
| 4,879,849 | 11/1989 | Hollingsworth, III et al. . |
| 4,892,419 | 1/1990 | Hyatt .................... 364/474.01 |
| 5,009,412 | 4/1991 | Roodenburg et al. . |
| 5,052,932 | 10/1991 | Trani . |
| 5,063,335 | 11/1991 | Baechtel et al. .................... 318/609 |
| 5,162,986 | 11/1992 | Graber et al. .................... 364/146 |
| 5,179,525 | 1/1993 | Griffis et al. .................... 364/512 |
| 5,192,247 | 3/1993 | Barr et al. . |
| 5,202,837 | 4/1993 | Coe et al. .................... 364/476 |

(List continued on next page.)

OTHER PUBLICATIONS

Isdale, "What is Virtual Reality" by Isdale Engineering, ACM Siggraph publication Computer Graphics, vol.26, #3, Aug. 1992.

Maddalon, "Virtual Environment Technology Laboratory", The NASA/University of Houston, 1997.

Soby, "Possessed by Virtual Reality", International Symposium on Virtual Reality and New Technologies in Computer Simulation at Vienna, Dec. 3, 1993.

*Primary Examiner*—James P. Trammell
*Assistant Examiner*—Cuong H. Nguyen
*Attorney, Agent, or Firm*—Howell & Haferkamp,LC

[57] ABSTRACT

An object oriented approach to virtual motion programming utilizes generic motion identifiers such as "turn" and "accelerate" in combination with modifiers such as the start and end times, the magnitude, and the direction of the motion object to be simulated to construct universal generic motion descriptions of complex motion events. The minimal bandwidth requirements of this virtual motion programming approach enables use of MIDI communication standards for virtual reality show systems and interactive computer applications, including video games. A virtual motion controller receives generic motion descriptions and breaks down the descriptions into their constituent parts. The controller expands the generic motion identifiers into general acceleration profiles and processes the general acceleration profiles with the modifiers to generate ideal acceleration profiles that define the acceleration components for the generic motion description with reference to an ideal motion platform having unlimited mechanical movement. The controller is configured with artificial intelligence for learning the capabilities of a particular motion platform. The controller translates the ideal acceleration profiles into customized position commands for the motion platform based upon the controller's knowledge of the platform's capabilities. The controller is configured with an offset processor for optimizing the position of the platform for maximum simulation of an ideal acceleration profile in the future. Position processors configured with fuzzy logic convert the position commands from the controller into control signals for the actuator motors of the platform, and prevents the actuators from overextending.

73 Claims, 20 Drawing Sheets

U.S. PATENT DOCUMENTS

| | | |
|---|---|---|
| 5,204,935 | 4/1993 | Mihara et al. . |
| 5,206,566 | 4/1993 | Yoshida et al. . |
| 5,209,661 | 5/1993 | Hildreth et al. . |
| 5,209,662 | 5/1993 | Fujita et al. . |
| 5,231,335 | 7/1993 | Mega et al. . |
| 5,241,651 | 8/1993 | Ueda . |
| 5,247,432 | 9/1993 | Ueda . |
| 5,269,687 | 12/1993 | Mott et al. . |
| 5,278,770 | 1/1994 | Gore et al. . |
| 5,282,772 | 2/1994 | Ninomiya et al. . |
| 5,320,538 | 6/1994 | Baum . |
| 5,341,079 | 8/1994 | Matsuura et al. ............ 318/632 |
| 5,370,535 | 12/1994 | Prendergast . |
| 5,414,799 | 5/1995 | Seraji ................................ 395/95 |
| 5,459,382 | 10/1995 | Jacobus et al. . |
| 5,490,784 | 2/1996 | Carmein . |
| 5,499,920 | 3/1996 | Trumbull .......................... 434/69 |
| 5,527,184 | 6/1996 | Trumbull .......................... 434/69 |
| 5,560,256 | 10/1996 | Tines ............................... 74/490.1 |
| 5,568,032 | 10/1996 | Wakui ............................. 318/632 |

VIRTUAL MOTION PROGRAMMING AND CONTROL

BACKGROUND AND SUMMARY OF THE INVENTION

Simulated motion control systems are used in virtual reality environments in order to create a virtual motion experience for a passenger or participant. Some popular examples of these virtual reality environments are Disney's "Star Tours" and Universal Studio's "Back to the Future." These systems provide a generally synchronized presentation of sound, film, motion, lighting, smoke, explosions, robots and/or animatronics to create the virtual reality experience.

A typical virtual motion platform will have between two and six degrees of freedom (DOF). FIG. 1 illustrates the six DOF that are associated with an ideal motion platform. These include the three translational movements of surge, sway, and heave along the x, y, and z axes, respectively, as well as the three rotational movements of roll, pitch, and yaw about these same axes. By utilizing this convention, any type of motion in a three dimensional space can be defined by specifying the translational and rotational components of that motion.

A serious disadvantage of prior art virtual motion systems is that the created motion material is platform specific and there are no platform standards. In other words, the motion commands that are used to direct the movement of a particular type of motion platform are not compatible with other types of platforms. As a result of this lack of portability of created motion materials, and given the complexity of programming virtual motion experiences by using prior art methods, there is always a shortage of virtual motion material for a specific type of platform as a single virtual reality experience becomes repetitive and ineffective for entertaining an audience for more than several weeks or at most several months.

The most notable shortcomings of prior virtual motion techniques are the complexity of the motion programming process and the uncertain quality of the virtual motion end product. As stated above, virtual motion material that is created for one type of motion platform is not compatible with other types of platforms. Therefore, a motion programmer, who is responsible for associating the mechanical movements of a motion platform to the visual cues of a film, is required to have an intimate understanding of the mechanical limitations of the particular platform upon which the virtual motion material will be simulated.

Ordinarily, an experienced motion programmer will study the visual cues of the film, and will attempt to move the motion platform in synchronization with the film by programming the platform movements with a computer keyboard or joystick, oftentimes while the programmer is positioned on the platform. Other times, the motion programmer mentally associates a visual cue of the film with a quantitative acceleration which would be experienced in real life, and then converts that acceleration to specific position attitudes, within the limitations of the particular motion platform, in an attempt to simulate the motion in the film.

The inventor herein is aware of a platform specific computer tool which allows a motion programmer to input accelerations for various DOF, and the computer will output the corresponding position commands for the motion platform to simulate the input accelerations. However, this tool is limited to a particular type of motion platform and will not allow an acceleration to be input which the motion platform cannot simulate. The tool also restricts inputs to a single acceleration profile, limited to the available DOF of the platform, for each moment in time. Thus, in the typical situation where the programmer is attempting to simulate a complex motion event, such as a turn combined with braking and vibration, the programmer cannot separately input acceleration profiles for each of the types of motion that make up the complex motion event for that point in time. Instead, the programmer must approximate the value of the acceleration profile that describes the complete event, and input that acceleration profile for conversion into the platform position commands.

The disadvantages of these prior art approaches to virtual motion programming are numerous. As alluded to above, the quality of the created motion material is highly dependent upon the abilities of the motion programmer and his degree of familiarity with the particular motion platform in question and, in any event, the created motion material can only be used on one type of motion platform. Another problem with prior art virtual motion programming results from a phenomenon known as "melting." In situations where the motion programmer is attempting to simulate several motion events at the same time, such as the simulation of a vehicle braking during a sharp turn on a bumpy road, the motion programmer often "melts" these several motion events into a single incoherent experience that is unrecognizable by the unconscious mind. Consequently, passengers or participants of the virtual reality environment may undesirably become disoriented or nauseated merely through experiencing an unrecognizable movement and not a closely simulated event.

Along this same line, adverse effects are often induced in the system participants due to poor synchronization between the virtual motion and the virtual reality film. This lack of proper synchronization frequently results because the motion programmer cannot precisely determine when a particular motion event is beginning or ending by simply viewing the film. Additionally, even where the programming quality is not at issue, operating variations in system hardware can result in various devices, including film projectors and motion platforms, drifting out of synchronization.

Yet another problem with prior virtual motion control systems is the manner in which the motion platform is controlled to simulate a desired motion effect. These control systems rely exclusively on position commands for execution by position processors in the motion platform so that a given motion experience can be simulated by precisely moving the platform from one position to another within a predetermined period of time. However, these systems fail to utilize any feedback information related to the simulated accelerations.

Instead, the control systems focus solely on one parameter, i.e., position, in an attempt to effect a second parameter, i.e., simulated acceleration. Consequently, simulated acceleration is inadvertently rendered a secondary effect, and the optimization of this parameter is thereby obscured. Unfortunately, those skilled in the art of motion control systems continue to focus their efforts on this position approach. While in the past, the control systems utilized 12 bit position signals, present systems have increased the resolution of position commands by using 16 and 32 bit control signals. In addition to the failure of these systems to monitor the most important effect to be implemented—simulated acceleration—the use of high resolution control signals requires the position processors to be even more precisely tuned to the motion platform hardware.

There is a long felt need for a universal virtual motion programming methodology that will enable virtual motion materials to be utilized by any type of motion platform despite its mechanical limitations. This methodology should allow complex motion events to be broken down into their various motion elements so these elements can be accurately simulated on the motion platform without melting. Preferably, such a methodology would be easy to implement so that nearly anyone could create virtual motion materials.

There is also a need for a virtual motion controller that is able to translate the universal motion language, created for an ideal motion platform, into position commands that take into account the mechanical limitations of the motion platform that receives these commands. Given that this translation process implies advance knowledge of the motion platform's capabilities, the controller will preferably be configured to automatically learn these capabilities. Furthermore, the controller should avoid heavy reliance on precise actuator positioning so that the need for precisely and frequently tuning position processors to their associated hardware can be obviated, and so that an overall smoother and more lifelike effect can be generated.

In order to solve these and other needs, the inventor herein has succeeded in designing and developing a universal virtual motion programming language for an ideal motion platform having 6 DOF and unlimited actuator excursion, and a virtual motion controller that is configured for translating the universal virtual motion programming language into customized positioned commands for any type of motion platform. It should be immediately apparent that by providing a virtual motion programming language that can be implemented with any type of motion platform, the present invention greatly advances the rate at which new virtual motion material will become available, thereby satisfying consumer demands for more virtual reality experiences.

The universal programming language takes an object oriented approach to virtual motion programming by reducing complex motion events into simple motion objects, called generic motion identifiers. Some example generic motion identifiers include "turn", "accelerate", and "vibrate". By assigning parameters or modifiers to these generic motion identifiers, one can fully define the attributes of the motion event to be simulated. For example, in the case of a turn, modifiers including the time duration, magnitude, and direction of the turn can be assigned to the generic motion identifier "turn", so as to fully define the attributes of any type of turn. These generic motion identifiers and modifiers can be combined to form generic motion descriptions which define the attributes of more complex motion events.

In addition to the ability of this virtual motion programming language to be implemented with any type of motion platform, it also results in a tremendous compression in the amount of data space needed to store or transmit virtual motion commands. Consequently, the programming methodology of the present invention enables virtual motion commands to be encoded in a MIDI communication standard, which provides significant advantages. One advantage results from the fact that most virtual reality environments are presently using a MIDI communication standard for synchronizing lighting, video, sound, etc. By encoding virtual motion information according to this MIDI standard, nearly every device in the virtual reality system will now be synchronized by the same MIDI clock signal, thereby coordinating their movement to increase the realism of the virtual reality experience.

Another advantage to encoding virtual motion data in a MIDI format stems from the fact that nearly every type of interactive computer application, including video games, use a MIDI communication standard for synchronizing video and sound. Thus, programmers of these interactive applications can now add motion commands to their programs which will ultimately result in virtual reality systems for the home environment.

The present invention also provides a motion editor, which is a Windows® based programming tool that enables virtual motion commands to be precisely synchronized to film, preferably during post-production. The motion editor includes a motion library from which a user can select generic motion elements for placement on a time line. The user can assign the appropriate modifiers to the selected generic motion identifiers by simply clicking on the appropriate graphical buttons. The motion editor also allows a user to create new generic motion elements, and to save created motion elements and descriptions to the motion library for future use. The "motion track" created by the motion editor and stored on a computer memory device is referred to as a ride file. Preferably, the motion editor also includes a table of ideal acceleration profiles for the generic motion identifiers. Each ideal acceleration profile includes six components which relate to the accelerations to be simulated in each DOF of an ideal motion platform. Thus, by providing a table of ideal acceleration profiles, a user can customize or edit the profile of a generic motion identifier as necessary or desired.

The virtual motion controller of the present invention is configured for receiving generic motion descriptions in the form of ride files created by the motion editor, and/or for receiving generic motion descriptions "on the fly" from an interactive computer application. By combining these two sources of generic motion descriptions, the former being non-interactive and the latter being interactive, a semi-interactive system can be implemented where the general course of the overall virtual motion experience is fixed, but additional motion effects are generated in response to inputs from a participant.

Upon receiving the generic motion descriptions, the motion controller breaks them down into their component parts which consist of generic motion identifiers and their assigned modifiers. The motion controller then expands the generic motion identifiers into ideal acceleration profiles by using a table not unlike, if not identical to, the ideal acceleration profile table of the motion editor. The motion controller then translates the ideal acceleration profiles into customized position commands for a particular motion platform with a multi-dimensional tabulating device. Prior to this translation process, the tabulating device completes a training phase during which it automatically learns the mechanical capabilities of the motion platform by randomly moving the motion platform through its motion envelope while monitoring feedback signals indicating the motion platform's position and the simulated accelerations. Thus, the tabulating device can learn how to simulate various accelerations with the motion platform by monitoring the acceleration feedback signal upon moving the platform from one attitude to another. In this manner, the motion controller can automatically learn the abilities of a motion platform, and can later use this information for simulating ideal acceleration profiles with the motion platform to the fullest extent possible.

The motion controller also contains automatic offset processing capabilities which are used to optimize the position of the motion platform for simulation of upcoming ideal acceleration profiles having large acceleration components. For example, if a generic motion description requires a dive followed shortly thereafter by another dive, the motion platform will quickly reach the end of its actuator strokes and may not be able to simulate the second dive. To minimize this occurrence, the motion controller will automatically move the platform in an imperceptible manner during the time between the two dives so that the motion platform will be positioned for simulation of the second dive. This offset processing capability is particularly useful in the case of playback of ride files because, in that case, the controller receives the generic motion descriptions with time stamps well in advance of the time at which the descriptions are to be simulated.

The present invention also provides position processors configured with fuzzy logic modules for use with each actuator of the motion platform to convert position commands received from the motion controller into control signals for the actuator motors. As alluded to above, the motion controller learns how to simulate various accelerations on the motion platform by randomly moving the platform with respect to several DOF. Thus, the motion controller does not rely on precise positioning of the platform, but rather learns how to combine movements with respect to several DOF by simulating accelerations. This departure from the precise actuator positioning approach of the prior art enables the implementation of fuzzy logic in the position processors. Consequently, abrupt actuator movements are minimized, both in the active and end-of-stroke regions of the actuators, which improves the lifelike effect of the simulated motion as well as the service life of the platform while drastically reducing service requirements.

While the principal advantages and features of the invention have been described above, a greater understanding of the invention may be attained by referring to the drawings and the description of the preferred embodiments which follow.

DETAILED DESCRIPTION OF THE PREFERRED EMBODIMENTS

Overview

The present invention provides a universal virtual motion programming language, and a virtual motion controller configured to translate the universal language into customized position commands for any type of motion platform. The universal language uses generic motion identifiers, such as "turn" or "accelerate," to construct generic motion descriptions that are to be simulated by the virtual motion control system.

Figure 1:
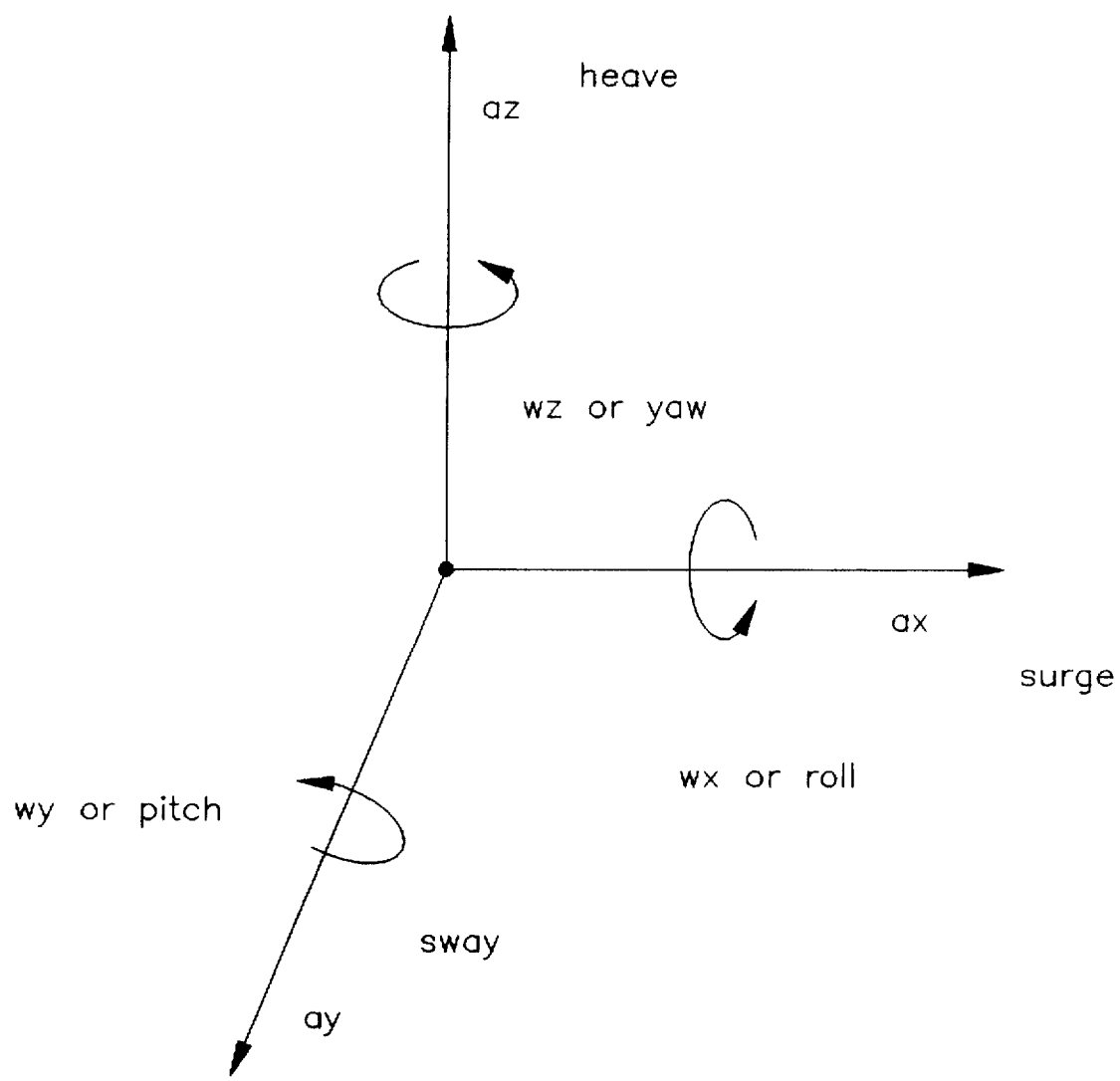
FIG. 1 is a coordinate diagram illustrating the six degrees of freedom in a three-dimensional space.
Figure 2:
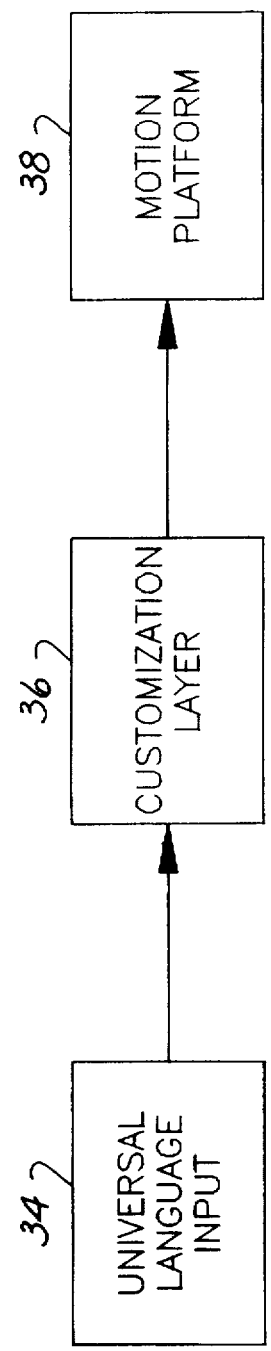
FIG. 2 is a block diagram of a virtual motion control system according to the present invention.

FIG. 2 is a block diagram of a virtual motion control system using the universal virtual motion programming language of the present invention. The system includes a universal language input 34, a customization layer 36, and a motion platform 38 having limited mechanical capabilities. The customization layer 36 receives generic motion descriptions from input 34 and converts them into position commands that take into account the limited mechanical capabilities of motion platform 38. The universal language is written for an ideal or perfect motion platform having six DOF and unlimited mechanical movement. Thus, by using this virtual motion programming language in conjunction with a virtual motion control system having a customization layer 36, the language is suitable for use with all motion platforms ranging from those having only one or two DOF and very limited capabilities to those having 6 DOF with large actuator strokes.

Figure 3:
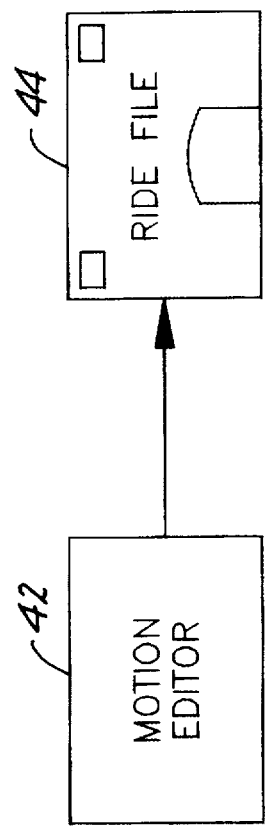
FIG. 3 is a block diagram of a motion editor and a ride file created thereby.

The present invention also provides a useful programming tool, called a motion editor, for precisely synchronizing virtual motion programming with film, sound, and other aspects of a virtual reality environment. As shown in FIG. 3, the output of the motion editor 42 is a universal ride file 44, typically saved on a computer diskette, for playback on a virtual motion control system having a customization layer 36. The ride file 44 contains generic motion descriptions arranged in a relative time order. Given that the contents of the ride file are generally fixed, it is generally limited to use with non-interactive and semi-interactive virtual reality environments, as explained further below. Although the ride file has been described as containing motion only, it can instead be incorporated into a show file for a virtual reality experience along with video commands, sound commands, etc.

Figure 4:
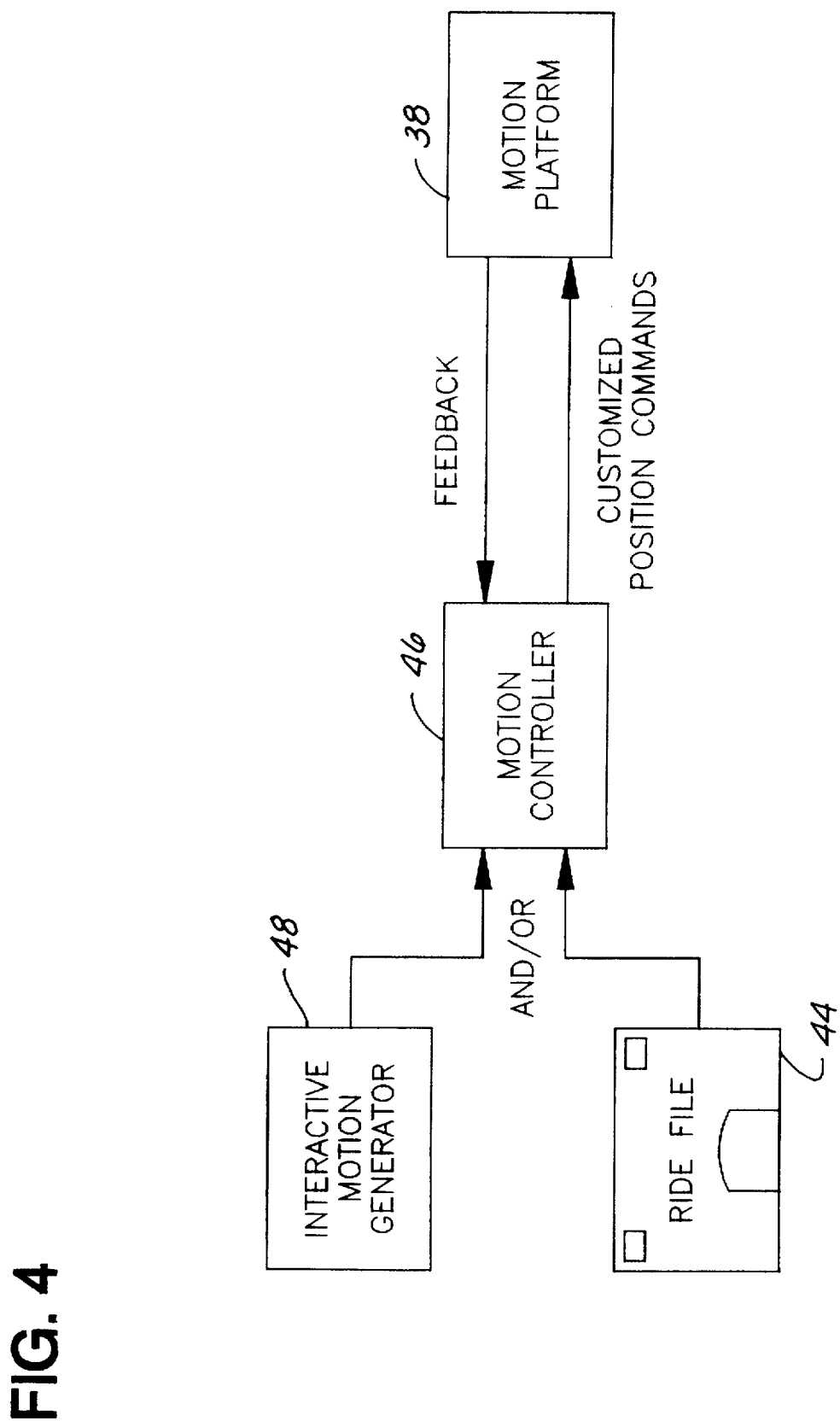
FIG. 4 is a more detailed block diagram of the virtual motion control system illustrating the two types of input formats for the motion controller.

The ride file 44 is only one of several ways in which generic motion descriptions can be input into the virtual motion control system. As shown in FIG. 4, a motion controller 46, which includes the universal language input 34 and the customization layer 36 of FIG. 2, is capable of receiving generic motion descriptions in two types of formats, either separately or simultaneously. The first type of format is the ride file 44 which is created by the motion editor 42 mentioned above, and which can be transferred into the motion controller for future playback of the generic motion descriptions in their relative time order. The second type is an "on the fly" format where the generic motion descriptions are created in real time by an interactive motion generator 48, and are then sent to the motion controller for almost immediate simulation on motion platform 38. This second type of format will typically be utilized when the virtual motion controller is used with interactive systems, including computer video games, but can also be used in conjunction with a ride file to create a semi-interactive virtual reality experience.

Based on feedback from the motion platform 38, motion controller 46 can determine the limited capabilities of the motion platform and can generate customized position commands which make the best possible effort at simulating the inputted generic motion descriptions, despite the motion platform's limited capabilities.

Object Oriented Virtual Motion Programming

The present invention takes an object oriented approach to defining motion experiences by breaking up complex motion events into constituent parts that can be independently recognized by the unconscious mind. These constituent parts, called motion archetypes, are generic identifiers to which the unconscious mind associates acceleration profiles experienced during a particular real life motion event. For example, when a person is travelling in an automobile that takes a right turn, the various accelerations experienced by the individual from the beginning of the turn until the end of the turn, including contributions from centrifugal and gravitational forces, are simply recognized by the unconscious mind as being a "right turn." Thus, a blindfolded individual riding in that same automobile will not see that the automobile has taken a turn, but will nevertheless experience and recognize the various accelerations during the turn, and will know that a right turn has occurred.

Although typical motion experiences are not as simplistic as a right turn in a single plane, the unconscious mind breaks down more complex motion experiences into their constituent motion archetypes so that, for example, an individual experiencing take off in a jet aircraft can separately recognize the independent components of this motion experience, including the components due to the aircraft's acceleration, the aircraft's pitch, and vibrations from air turbulence. Thus, despite the complexity of a given motion experience, the unconscious mind will recognize the experience as a combination of a fixed number of motion archetypes.

Of course, not all turns, for example, are alike, so a generic motion identifier, by itself, is insufficient for fully defining all of the attributes of a given motion experience. However, by assigning modifiers to a generic motion identifier, such as the start time, end time, magnitude, and direction of the particular motion, the characteristics of any given motion experience can be fully defined. In this manner, generic motion identifiers and their corresponding modifiers are utilized by the present invention to provide an object oriented approach to virtual motion programming.

The benefits of this approach to virtual motion programming are numerous, including the fact that a motion programmer can now break down complex motion events into their independent motion objects. As a result, all of the attributes for each motion object are included in the virtual motion programming to thereby avoid undesirable melting. Hence, an optimal simulation of the complex motion event is made so that a participant or passenger of a particular virtual reality environment receives a clear and complete conveyance of the simulated motion event.

Additionally, by combining simple generic motion identifiers and modifiers to describe a complex motion event, the present invention provides a user friendly language that enables the creation of virtual motion materials by individuals other than experienced motion programmers. For example, virtual reality producers, who are most familiar with the desired effects to be simulated, can now add motion to their films during post-production in the same manner as is presently done for sound.

Another advantage provided by the object oriented approach of the present invention is the creation of a universal standard for virtual motion programming. In the example stated above, the producer can combine generic motion identifiers and modifiers to define the ideal motion experience to be conveyed without regard to the mechanical limitations of the particular motion platform upon which the virtual motion experience will be simulated. Instead, the film producer creates a "motion track" which describes every motion event in the film, and which assumes that the created material will be played back on an ideal motion platform having six DOF and unlimited mechanical movement. By utilizing this universal approach in conjunction with the other teachings of the present invention for translating generic motion descriptions into position commands for a particular motion platform, virtual motion materials can be played back on any motion platform, despite its particular limitations. Consequently, the universal virtual motion programming language provided by the present invention will increase the rate at which new virtual motion materials become available.

Still another advantage of the virtual motion programming language provided by the present invention is the tremendous data compression that results from using simple generic motion identifiers and modifiers. As an example, and with reference to the MIDI communication standard for virtual reality show controllers, encoding the actuator position commands for a simple turn would require approximately twenty to thirty thousand samples, which well exceeds the capacity of the MIDI communication standard. In contrast, only two or three samples are required to encode the generic motion identifier "turn" (depending on the overall number of possible generic motion identifiers), with a limited number of additional samples being required to encode the modifiers associated with that turn. This results in a digital data compression on the order of approximately 10,000 times. Thus, the data compression provided by the virtual motion programming language of the present invention allows use of the MIDI show control standard to synchronize virtual motion platforms to other virtual reality devices, and allows virtual motion programming to be extended to interactive video games, which already utilize MIDI communication standards for synchronizing sound with video, etc.

MIDI Communication Standards and Virtual Motion Programming mentioned above, using the universal virtual motion programming method of the present invention extends the capabilities of MIDI communication standards to virtual motion information. Although present MIDI standards are considered to be slow channels, and are incapable of handling the bandwidth requirements of actuator position commands for virtual motion platforms, the MIDI communication standard is ideal for transmitting virtual motion information when the information is encoded as simple generic motion identifiers and modifiers that form generic motion descriptions.

The advantages to using MIDI communication standards for transmitting virtual motion information are twofold: it allows motion platforms to be precisely synchronized with other show equipment in virtual reality environments; and it allows for the adaptation of virtual motion to interactive systems such as computer video games.

With respect to the former, MSC version 1.0 is presently in widespread use in virtual reality environments for synchronizing film, sound, animatronics, explosions, etc. By encoding generic motion descriptions in the MSC format, including the use of MSC time stamps, the accelerations simulated by a motion platform can be precisely synchronized to the other devices in the virtual reality environment, thereby optimizing the simulated effect on the system participants. Thus, even when there are variations in the MIDI clock, the movements of the motion platform will remain in synchronization with the other show devices that operate with reference to the MIDI clock.

Figure 5:
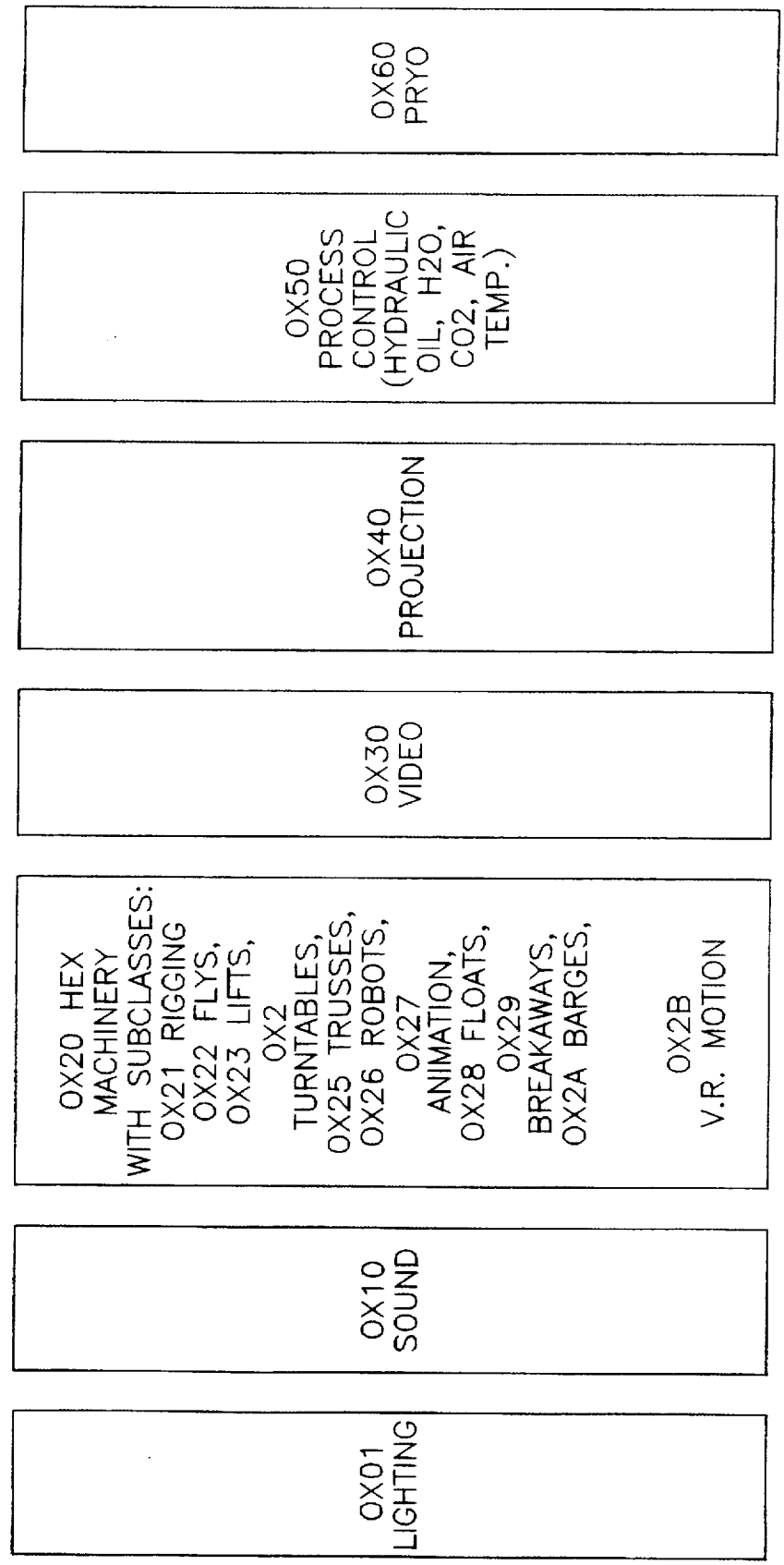
FIG. 5 is a logic diagram illustrating the MIDI Show Control classes with a code assigned for virtual reality motion.

FIG. 5 illustrates the system exclusive code allocations for the MIDI Show Control communication standard, version 1.0. As shown therein, the different codes are allocated for identifying data related to lighting, sound, machinery, video, etc. The inventor herein has assigned the code 0X2B as identifying virtual motion data. While this specific code has been selected due to its availability and due to the fact that a mechanical motion platform seems to belong under the general heading of "machinery," it should be understood that any code could be allocated to identify the virtual motion data, provided that the motion controller's MIDI interface is aware of the specific code allocation. Moreover, although the MIDI communication standard is the preferred format for virtual motion programming due to its widespread use in existing virtual reality environments and interactive computer applications, it should be understood that the minimal bandwidth requirements of the virtual motion programming language provided by the present invention makes it amenable to nearly any type of communication standard.

Nearly all interactive systems utilize a MIDI communication standard for synchronizing the sound and video effects that are typically generated in response to mouse, joystick, or keyboard inputs. These systems include video and sound effect engines that create various commands in response to the user inputs. These commands are then sent over a MIDI channel to the appropriate devices, including video monitors and audio speakers, which then implement the received commands with reference to the MIDI clock. By utilizing the universal programming methodology of the present invention, interactive system programmers will have an additional tool, i.e., virtual motion, to add to their programming arsenal. Thus, the virtual motion controller of the present invention, which is explained in detail below, can be used in a home environment, for example, along with a motion platform to add virtual motion effects to the video and sound that presently accompany computer video games.

Furthermore, the extension of MIDI communication standards to virtual motion enables a combination of interactive systems with non-interactive systems. Many virtual reality environments are non-interactive in the sense that the passenger does not control the direction or progression of the virtual reality experience. Instead, the passenger is merely "along for the ride." However, with the virtual motion methodology of the present invention, interactive effects can be added to formerly non-interactive systems to create a semi-interactive environment. In other words, the virtual reality control system can be configured to simultaneously implement generic motion descriptions from both a ride file and an interactive motion effects generator. As a simple example, an otherwise non-interactive virtual motion environment can be configured to simulate a vibration in response to a participant firing a canon or missile from the virtual reality environment.

Motion Editor

The present invention also provides a computer-implemented tool, called a motion editor, for implementing the object oriented programming methodology described above. The motion editor is used for creating ride files that are to be played back with film in a virtual reality environment. In the preferred embodiment, the motion editor is a Windows®-based software package for IBM compatible PCs.

The motion editor can be broken down into two parts: a ride file editor; and a generic motion identifier editor. The ride file editor preferably includes a library of the following generic motion identifiers: ACCELERATE for the start of motion, or to simulate a force field or media border; TURN for a change in direction toward any point in space; BRAKE for negative acceleration; CLIP, which combines a brake with a spin, for simulating side collisions; VIBRATE for simulating motion through a periodically changing media; RANDOM VIBRATE for simulating motion through a randomly variable field such as air turbulence, or for simulating a loss of control; EXPLOSION WAVE, which is a combination of a change in acceleration and a random vibration, for simulating an explosion wave-front; and ROLL.

As apparent to those well versed in psychoanalytic theory, not all of the generic motion identifiers provided in the motion library are true motion archetypes, i.e., they are not separately recognized by the unconscious mind as independent motion events. For example, BRAKE, as stated above, is merely a negative acceleration, and is generally believed to be recognized by the unconscious mind as an acceleration. However, these non-motion archetypes are included in the motion library due to the frequency with which they are used in virtual motion programming. Thus, the motion library of the preferred embodiment can be thought of as already being customized. As explained below, the library can be further customized by a user to suit his particular programming needs.

The editor allows a film producer, for example, to add motion to her film in the same manner as sound. This user friendly package allows generic motion identifiers, as well as previously stored generic motion descriptions, to be called from the motion library and placed on a time line. Preferably, the ride file editor allows the film to be displayed on the screen along with the created motion descriptions. By clicking on appropriate graphic buttons, the time window is moved through the film to display the generic motion descriptions assigned to each piece of the film. This time window can be expanded or contracted for viewing the created motion effects in detail, or to get an overview. The created generic motion descriptions for each moment in time are displayed on event lines showing each generic motion identifier that makes up the desired motion effect.

Once placed at the appropriate time, the character of a generic motion identifier may be specified by assigning modifiers to the generic motion identifier, including the starting and ending time of the motion, the magnitude and direction of the motion (expressed in polar coordinates), the frequency if a vibration, and the level of refinement for motion identifiers having vibrational components. This last modifier is used for varying the refinement character of a generic motion identifier from a smooth effect to an edgy or stressed effect by varying the stopband of a highpass filter. It does not truly correspond to a real world motion attribute, but instead is analogous to the use of high pitched music in films to create tension for the viewer.

These modifiers are selected by clicking the appropriate icons or graphic buttons and dragging them with a mouse just as in a sound editing package. As this process proceeds, generic motion descriptions made of a combination of generic motion identifiers and their assigned modifiers may be named and saved to the motion library for future use, thereby extending the library and making it increasingly valuable for future edits.

Once the edit is complete, the created ride file is stored to a computer diskette, for example, for transporting the ride file to a motion controller configured according to the present invention. Preferably, the ride file is formatted according to a MIDI communication standard so that the motion controller can synchronize the generic motion description with the film, sound effects, etc. Note that the ride file is created without consideration of the motion platform upon which it will be simulated. On the contrary, a ride file is created on the assumption that it contains an ideal description of the motion for the film without any limitation as to the degrees of freedom or range of motion. Consequently, the ride file is in a universal format and, with the motion controller of the present invention, can be translated for use with any type of motion platform.

As explained further below, the motion controller breaks down generic motion descriptions into individual generic motion identifiers, and then translates each identifier into an ideal acceleration profile. An ideal acceleration profile for a generic motion identifier consists of six components, where each component corresponds to one of the six DOF of an ideal motion platform. The motion editor will preferably include a generic motion identifier editor, in addition to the ride file editor, so a user can edit the ideal acceleration profile associated with a generic motion identifier in accordance with that user's subjective preferences, and to foster "tweaking" the ideal acceleration profile for a generic motion identifier until it is, in fact, ideal. Providing the motion editor with this capability also enables a programmer to create new ideal acceleration profiles for new generic motion identifiers.

Virtual Motion Controller

Figure 6:
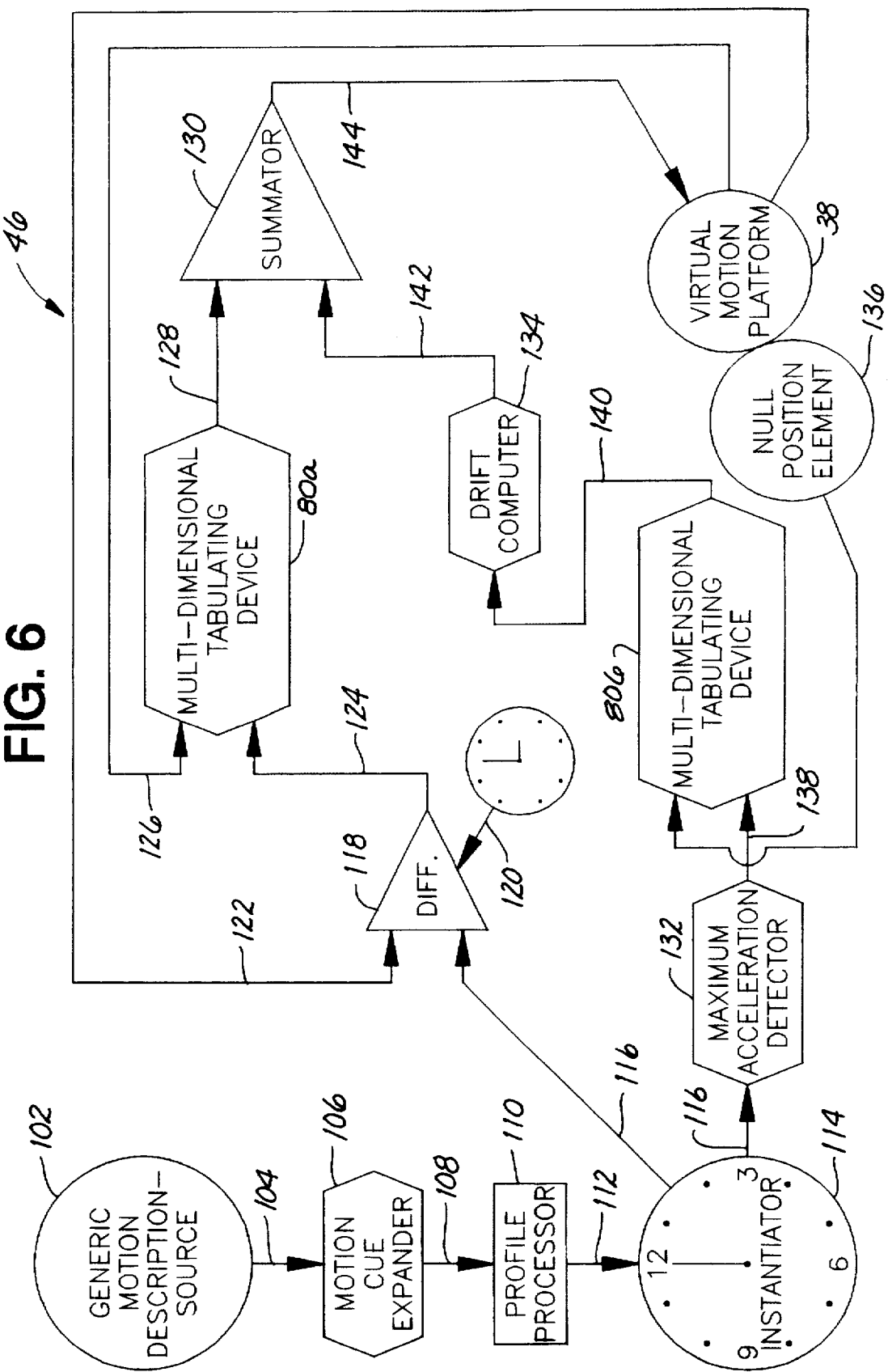
FIG. 6 is a detailed logic flow diagram illustrating the processing of the generic motion description by the motion controller.

FIG. 6 is a detailed flow chart of a virtual motion control system according to the present invention, which includes the motion controller 46 and the motion platform 38 (which includes a position processor for each of its actuators). The majority of the elements illustrated in FIG. 6 belong to controller 46, except for the null position element 136 and the motion platform 38. In the preferred embodiment, the controller is a multi-tasking PC with a Windows® based environment, and is configured with software for carrying out the functions for each of the elements described below. Additionally, because all of the generic motion descriptions processed by the controller are formatted according to a MIDI communication standard, the controller PC also includes a MIDI interface card for receiving the generic motion descriptions and for receiving a MIDI absolute time signal.

In operation, the generic motion description source 102 provides a series of generic motion descriptions 104 to a motion cue expander 106. As discussed above, the generic motion description source 102 may correspond to a ride file stored on a computer diskette, a ride file embedded in a show file provided by a virtual reality show controller, and/or a series of motion commands from an interactive computing device. The particular implementation illustrated in FIG. 6 assumes that each generic motion description 104 is formatted with a relative time code that indicates, with reference to the immediately preceding generic motion description, the time at which the generic motion description is to be simulated.

The motion cue expander 106 breaks down the generic motion descriptions 104 into their constituent generic motion identifiers, and translates each generic motion identifier into a generic acceleration profile having six components for the six DOF of an ideal motion platform. The motion cue expander 106 outputs the generic acceleration profiles 108 along with their relative time stamps and the modifiers that were assigned to their generic motion descriptions during the universal motion programming. The generic acceleration profiles 108 are then received by a profile processor 110 which performs rotation and/or projection processing of the generic acceleration profiles 108 in accordance with their assigned modifiers.

Profile processor 110 merely performs a transformation of coordinates from one reference system to another when such translation is necessary. Thus, it redistributes the six possible acceleration components of a generic acceleration profile based on the modifiers that were assigned to the generic motion identifier associated with the generic acceleration profile in question. For example, suppose the controller is simulating the accelerations experienced while riding in an automobile. If the automobile experiences clipping, i.e., an impact from the side, the accelerations experienced by the passenger will depend upon the relative position of the passenger with respect to the point of impact. If the automobile experiences an impact directly to the right of a passenger facing forward, the passenger will experience accelerations only in the sway direction. However, if the automobile experiences an impact that is both forward and to the right of the passenger, the experienced acceleration profile will also include a component in the surge direction. Thus, based upon the modifiers associated with a generic motion identifier which identify the coordinates for the impact, the profile processor 110 projects the generic acceleration profile for the point of impact to the system of reference for the virtual motion participant.

The profile processor 110 outputs relative time stamped ideal acceleration profiles 112 which perfectly simulate the original generic motion description associated therewith if implemented on an ideal motion platform having six DOF and unlimited actuator stroke. The ideal acceleration profiles 112 and their relative time stamps are provided to an instantiator 114 that replaces the relative time stamps for the ideal acceleration profiles 112 with absolute time stamps. Thus, after the ideal acceleration profiles 112 are processed by the instantiator 114, the profiles will contain time stamps that indicate an absolute MIDI time at which the profiles are to be simulated. Although the use of relative time stamps in MIDI communications is more conventional, if the generic motion descriptions 104 were originally stamped during virtual motion programming with an absolute MIDI time stamp, then the instantiator 114 could be eliminated.

The instantiator 114 outputs the ideal acceleration profiles 116 with their absolute time stamps to a differentiator 118. The differentiator 118 also includes an input for the MIDI absolute time signal 120. The differentiator 118 buffers the ideal acceleration profiles 116 received from the instantiator 114, and continuously compares their absolute time stamps with the MIDI absolute time signal 120. The differentiator 118 also receives a simulated acceleration feedback signal 122 from the motion platform 38, which is provided to differentiator 118 in real time. When the absolute time stamp of an ideal acceleration profile 116 is equal to the MIDI absolute time signal 120, the differentiator calculates the difference between this ideal acceleration profile and the simulated acceleration feedback signal 122, and outputs this difference as an ideal acceleration profile request 124.

Hence, the ideal acceleration profile request 124 is simply an error signal that represents the difference between the ideal acceleration profile that is to be simulated at the present and the actual acceleration profile presently simulated by the motion platform 38.

The simulated acceleration feedback signal 122 is generated by accelerometers positioned on the motion platform 38. The accelerometers are positioned on the motion platform 38 so as to indicate the accelerations experienced in all six DOF from the perspective of the virtual motion participant, regardless of whether the motion platform 38 is capable of moving in all six DOF. In the preferred embodiment, the accelerometers are micromachined silicon-based accelerometers.

The ideal acceleration profile request 124 is provided as an input to a multi-dimensional tabulating device 80a, which is a neural network that has completed its learning process. For purposes of FIG. 6, it should be assumed that the tabulating device 80a has already learned the mechanical limitations of the motion platform 38 during a training process described in detail below. The tabulating device 80a also receives a position feedback signal 126 from the motion platform 38 which indicates the precise position of the motion platform in real time. The tabulating device 80a translates the ideal acceleration profile request 124, either directly or through extrapolation, into position commands 128 that will most closely simulate the ideal acceleration profile request 124 given the present position and mechanical limitations of the motion platform 38. Tabulating device 80a outputs the position commands 128 in real time to summator 130 which in turn provides the position commands to the motion platform after augmenting the position commands with position contributions from the offset processor of the motion controller, discussed below.

In the case where the motion platform does not have movement capabilities in one or more particular DOF, tabulating device 80a will nevertheless attempt to simulate an acceleration profile request having a component in this missing DOF by moving the platform about two or more other DOF so as to create at least some of the requested acceleration component for the missing DOF. For example, if the ideal acceleration profile request contains a component in the heave direction, but the motion platform does not have heave capabilities, the tabulating device 80a may combine a pitch with some surge so as to generate, as much as possible, the requested acceleration component for the heave direction. In this manner, the virtual motion controller of the present invention can simulate to the greatest extent possible an ideal acceleration profile on any type of motion platform by utilizing the fullest extent of the motion platform's capabilities.

The instantiator 114 also outputs the ideal acceleration profiles 116 with their absolute time stamps to the offset processor which includes a maximum acceleration detector 132, a multi-dimensional tabulating device 80b, a drift computer 134, and a null position element 136. The maximum acceleration detector 132 receives and buffers the ideal acceleration profiles 116, and selects the largest component of the ideal acceleration profiles, for each DOF, that are to be simulated within some predetermined window of time which, in the preferred embodiment, is five seconds. The maximum acceleration detector 132 outputs this selection as a set of maximum acceleration samples 138 to the tabulating device 80b.

Tabulating device 80b also receives an input from the null position element 136 which indicates the constant null position of the motion platform, which may or may not correspond to the midpoint of the platform's actuators. In order to receive this information, the motion controller can be hardwired, or alternatively, can have this information preprogrammed. Tabulating device 80b is a counterpart to tabulating device 80a, and will have determined the mechanical limitations of the motion platform 38 during the training process. Ideally, tabulating device 80b would receive a signal indicative of the motion platform's future position so that it could determine the precise position of the platform that is required to simulate the set of maximum acceleration samples 138. However, because the motion controller of the preferred embodiment is configured for use with interactive systems in addition to playback of ride files, it is not possible for tabulating device 80b to receive an indicator of the motion platform's future position because this position is not fixed, but rather depends upon inputs from the user of the interactive system. Instead, an approximation is made by assuming that the motion platform will be at the null position at this future point in time. Thus, tabulating device 80b outputs an offset command that is designed to move the motion platform from the null position to the position required for future simulation of the set of maximum acceleration samples 138.

Drift computer 134 receives the offset command 140 from the tabulating device 80b, divides it by the number of output samples it can provide within the predetermined time window of five seconds, and outputs incremental drift commands 142 for the next five seconds to the summator 130. Thus, drift computer 134 is utilized to provide position commands that, if provided directly to the motion platform, would slowly and imperceptibly move the motion platform over the course of five seconds to the position required to simulate the maximum acceleration profile. In actuality, tabulating device 80b is likely to output an offset command 140 more frequently than once every five seconds such that the incremental drift commands 142 are likely to be recalculated and changed more frequently than once every five seconds. Nevertheless, the offset processor provides some offsetting contribution to the motion controller so that ideal acceleration profile requests are simulated by the motion platform to a greater extent than in the absence of the offset processor.

The automatic offset processing provided by the motion controller of the present invention is always performed based on the assumption that the motion platform 38 is located at its null position. Although, as a practical matter, this assumption will oftentimes be incorrect, it will nevertheless provide some offsetting contribution in those cases, and with a minimum of software complexity and without substantially degrading the ideal acceleration profiles which the tabulating device 80a is attempting to simulate on the motion platform 38 via position commands 128.

The incremental drift commands 142 from the drift computer 134 are provided to the summator 130 along with the position commands 128 provided by tabulating device 80a. The summator adds the incremental drift commands 142 and the position commands 128 and provides the resulting position commands 144 to the position processors of the motion platform 38. Although the offset processing of the motion controller can result in an increase or decrease in the extent to which the ideal acceleration profiles 116 are simulated, this minor alteration of the simulated acceleration is considered to be negligible and made up for by the increase in the motion controller's ability to simulate the maximum acceleration profile.

In the preferred embodiment of the invention, the motion controller will also include the capabilities of the previously described motion editor, which includes the ride file editor and the generic motion identifier editor. If a ride file is created remotely and transferred to the virtual motion controller, the ride file editor functions can be useful for altering the ride file to cure any technical difficulty arising from the customization process or otherwise. More importantly, the generic motion identifier capabilities should be included so that the control system operator can edit the acceleration profiles in the motion cue expander as needed or desired.

Figure 7:
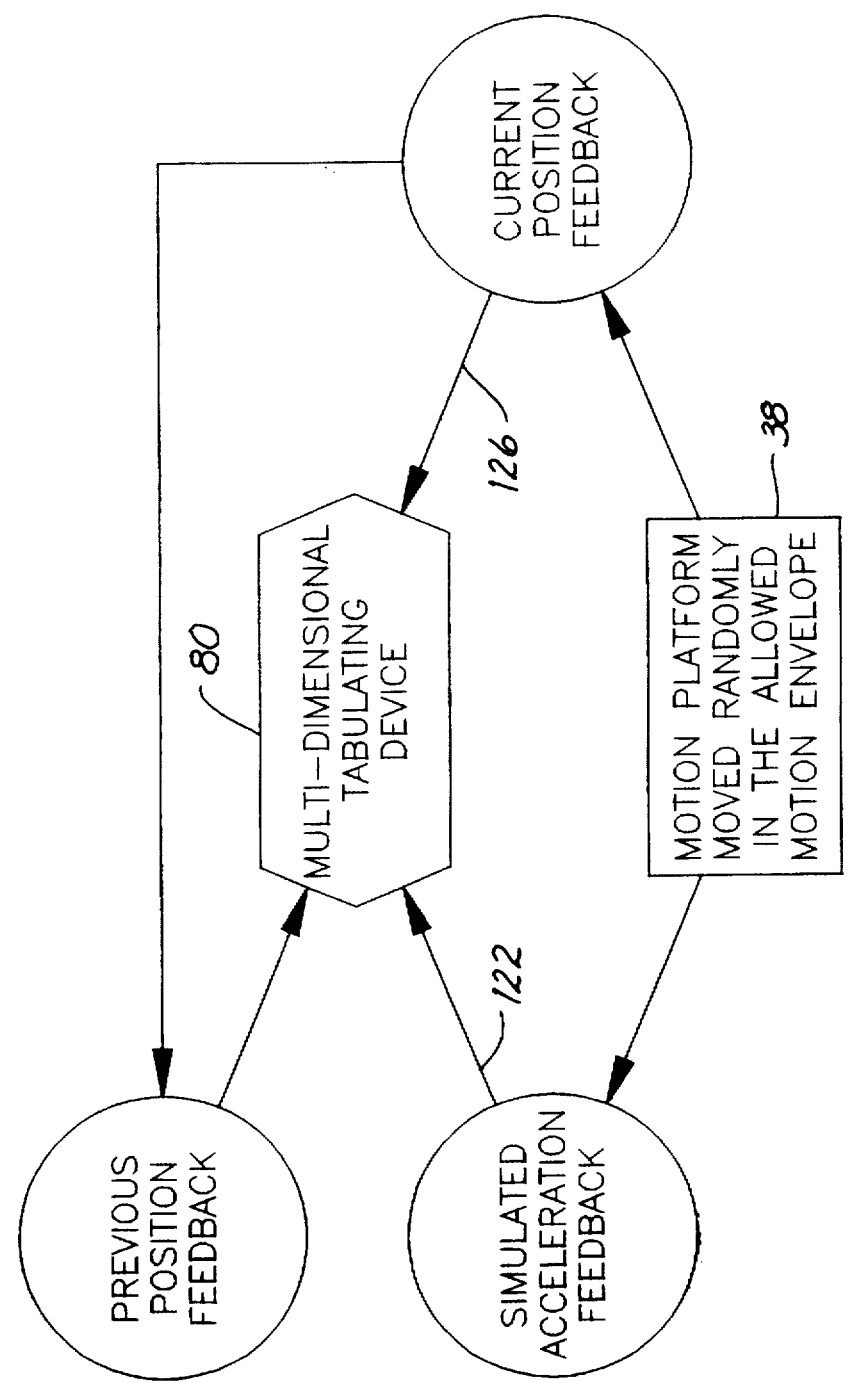
FIG. 7 is a logic flow diagram of the training process for the motion controller of the preferred embodiment.

FIG. 7 is a block diagram for the training process of the tabulating device 80. The tabulating device monitors the motion platform's current position, last position, and the simulated acceleration feedback signal while the motion platform is randomly moved throughout its motion envelope by the motion controller. During this process, the tabulating device learns that by moving the motion platform from its last position to its current position, an acceleration equal to the simulated acceleration feedback signal is created. The tabulating device stores this information as weights, and continues the learning process until it sufficiently resolves the data which characterizes the capabilities and limitations of the motion platform. Note that while FIG. 7 illustrates the previous position feedback signal as being provided to tabulating device 80 by the motion platform, the tabulating device preferably only receives a current position feedback signal from the motion platform, and buffers this data for future use as previous position feedback information.

During this learning process while the motion platform is randomly moved throughout the motion envelope, the platform is also brought to rest at random times so that the tabulating device can determine the static components of acceleration profiles in addition to the dynamic components. In the case of motion platforms having closed capsules, where the film is provided inside the capsule and a passenger is unaware of the true position of the capsule because he cannot see the external environment, the static components of various motion platform positions become especially useful for simulating long-lasting acceleration profiles. As just one example, by pitching a motion platform upwards, the static accelerations experienced by a passenger from gravitational forces can be used to simulate the accelerations that are experienced during a drag race where the passenger is forced into his seat for more than ten or twenty seconds at a time.

In the preferred embodiment, the functionality of the tabulating device is programmed using the Ward Systems neural network program, with includes preprogrammed libraries of neural network functions, in conjunction with additional code required to feed the appropriate data to the neural network subroutine.

As an alternative to the self-learning tabulating device described above, the motion controller could instead be programmed with the appropriate data for translating ideal acceleration profiles into customized position commands for a particular motion platform. A particular motion platform could be ran through a series of movements for manual collection of acceleration data much in the same way the multi-dimensional tabulating device of the preferred embodiment learns the limitations of a motion platform. Similarly, the motion controller can be configured with a mathematical model of a particular motion platform which would enable the motion controller to perform the translation process. In either event, however, substantial effort on the part of programmers is required, and the benefit of these efforts are limited to the particular type of motion platform to which they relate. Thus, the self-learning tabulating device is the preferred method of the present invention, and it is believed that eliminating a need for these alternative manual efforts will contribute to the widespread acceptance and implementation of the virtual motion controller of the preferred embodiment.

However, it also possible to utilize manually collected or modeled data for a particular motion platform, and to combine it with various teachings of the present invention in order to translate generic motion descriptions directly into customized position commands for that particular type of platform. It is also possible to utilize the virtual motion controller of this invention to translate a ride file into custom position commands for a particular platform, and to save the custom position commands for subsequent use with a like motion platform. In either case, it is the teachings of the present invention which enable these alternatives to the preferred embodiment, and these teachings therefore remain within the ambit of the methods and apparatus described herein.

Position Processor

Figure 8:
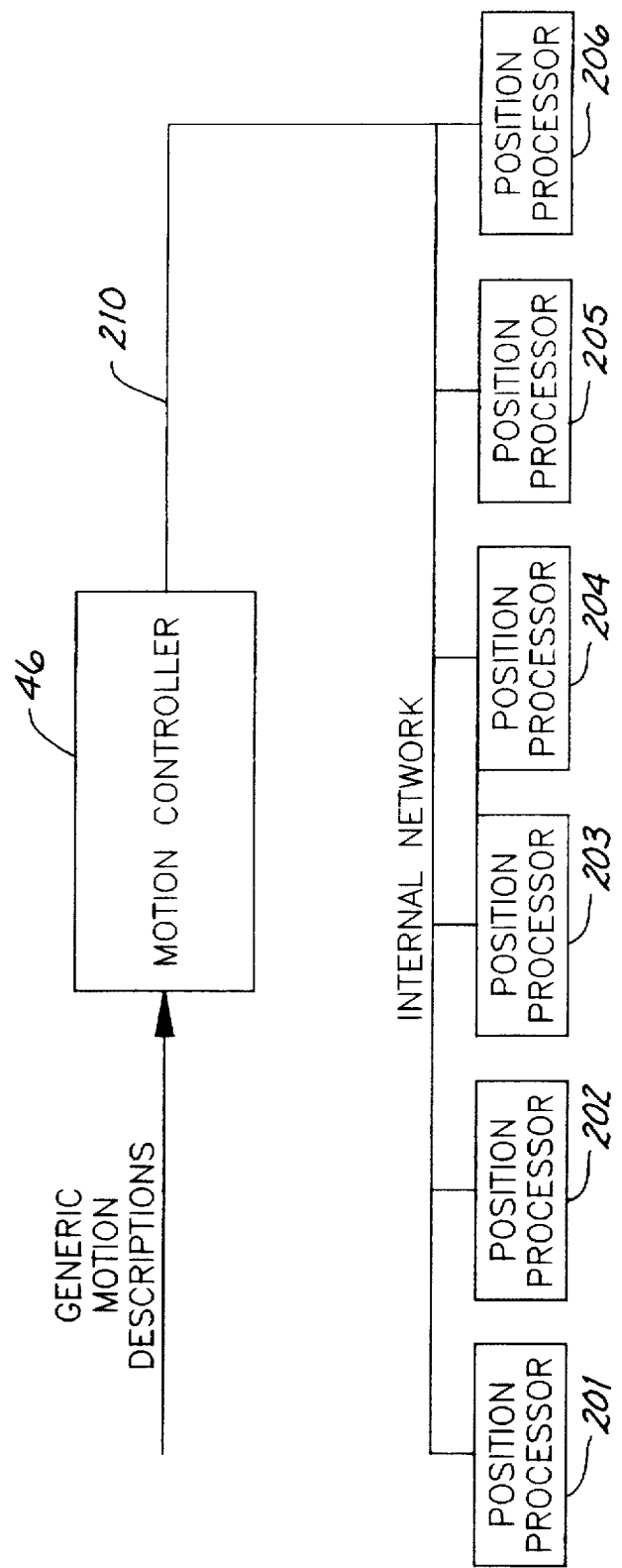
FIG. 8 is a block diagram illustrating the serial connection between the motion controller and the position processors associated with a motion platform.

The present invention also provides a position processor which is particularly suited for use with the virtual motion control system described above. A separate position processor is provided for each DOF of a particular motion platform. FIG. 8 illustrates the connection between the motion controller 46 and the position processors 201-206 for a motion platform having six DOF. In the preferred embodiment, the motion controller 46 communicates with the position processors 201-206 over an RS-485 serial communication link 210. Position processors 201-206 are preferably configured for controlling both electric and hydraulic actuators.

Figure 9:
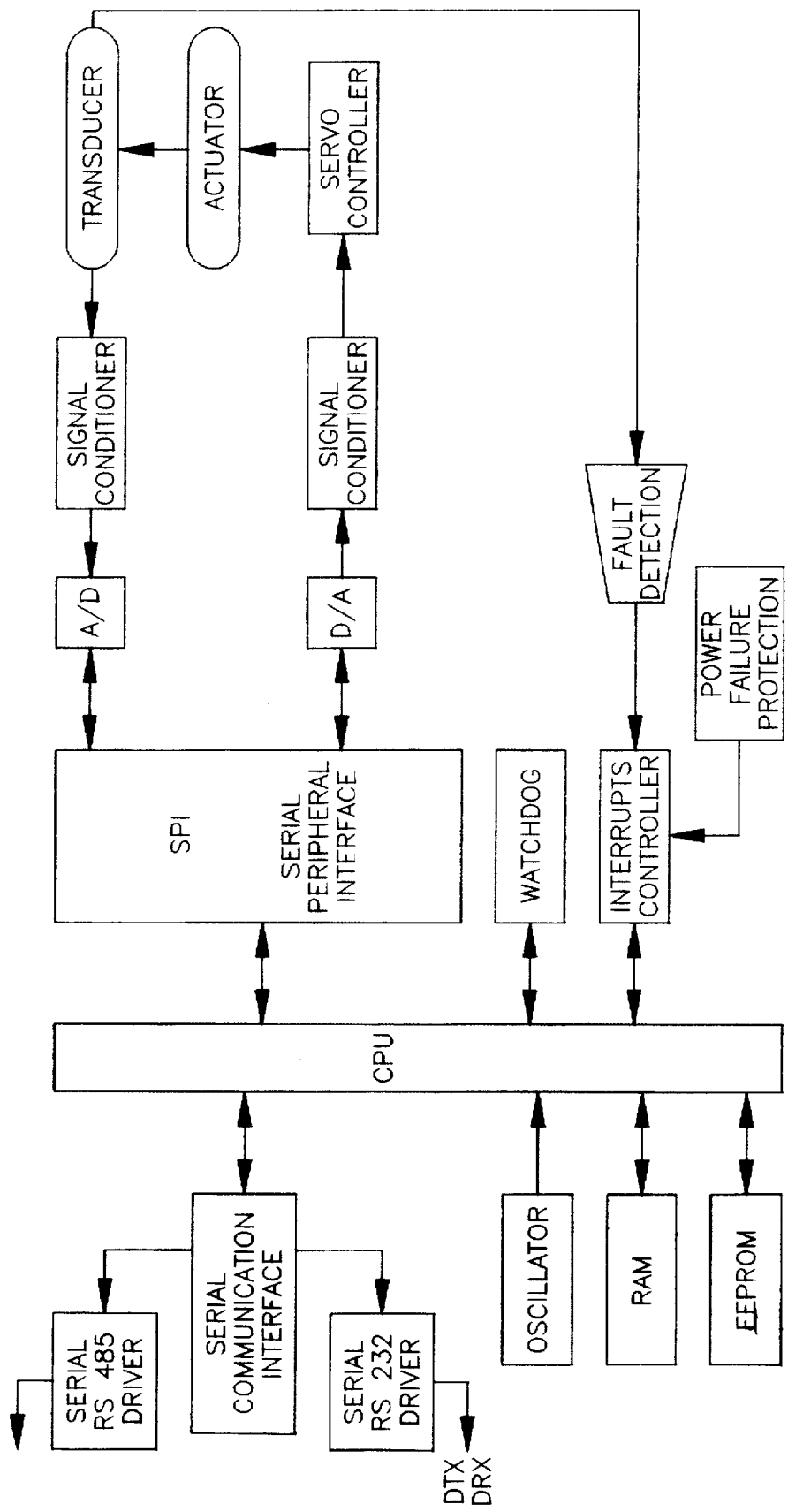
FIG. 9 is a schematic block diagram of the position processor of the present invention.

FIG. 9 illustrates the hardware associated with each position processor shown in FIG. 8, including a central processing unit (CPU), which is preferably a Motorola 68HC11 microprocessor. As a direct consequence of the object oriented approach to virtual motion programming taken by the present invention, it is the combination of platform actuator movements, rather than precise actuator positioning, which results in the simulated acceleration. Thus, because the motion control system is not restricted to precise positioning of the motion platform actuators, fuzzy logic can be utilized for controlling the platform actuators in response to the position commands received from the motion controller. This results in a simplified design for the position processor and generates a more natural and smoother effect by the motion platform. The use of fuzzy logic also eliminates a need to precisely tune the position processors to the platform actuators. Furthermore, by utilizing special fuzzy rules when an actuator is positioned in its end stroke region, the inventor has succeeded in creating asymptotes with fuzzy logic programming to prevent the actuators from abruptly realizing their actuator stroke limitations. Thus, the use of fuzzy rules in both the active and end stroke regions of the motion platform actuators substantially reduces the wear and tear on the motion platform and, consequently, reduces service requirements while increasing the platform's longevity.

Figure 10:
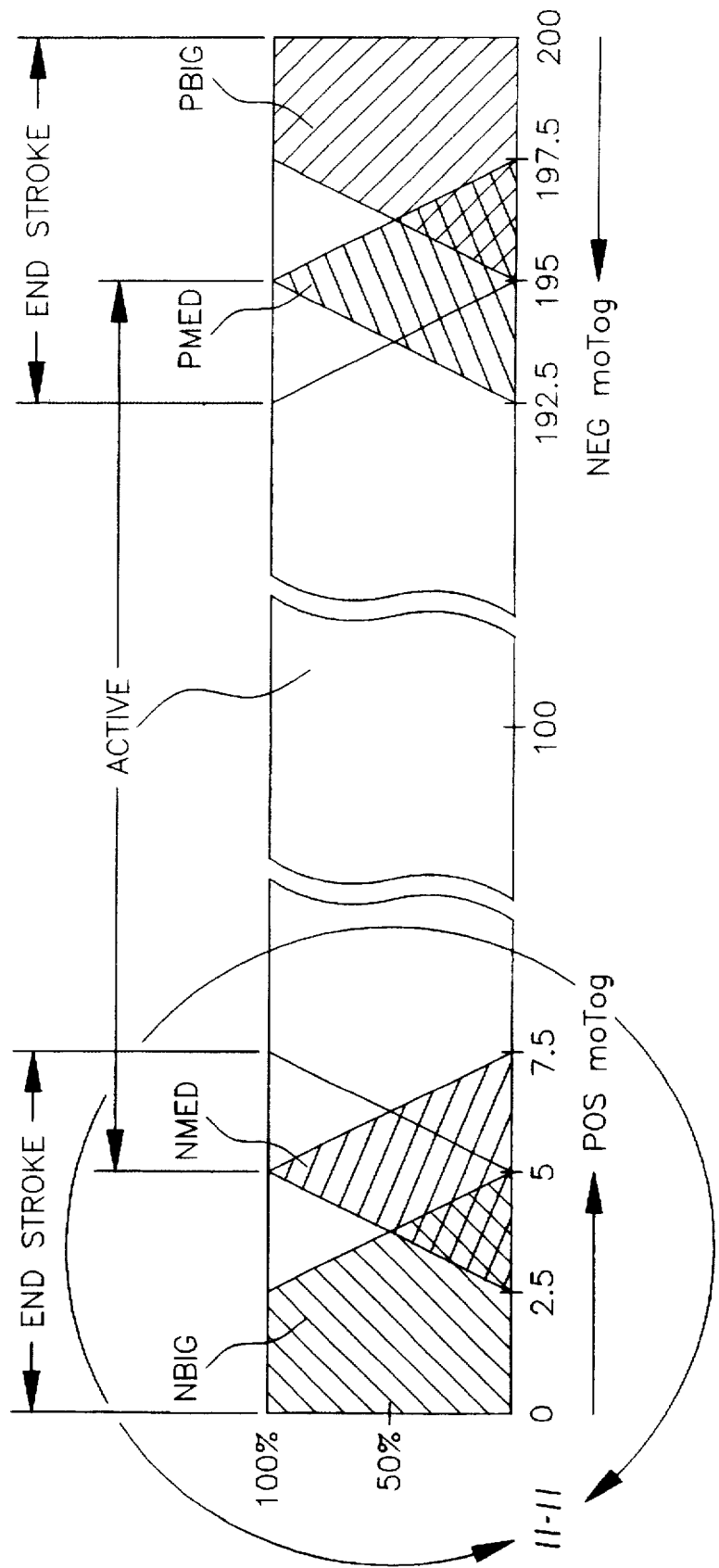
FIG. 10 is a chart illustrating the fuzzy classes assigned to actuator stroke positions by the position processor.

FIG. 10 is a diagram of the actuator stroke regions and the fuzzy class assignments. The lower horizontal axis represents the actuator position between zero and two hundred. When the actuator is positioned between 5 and 195, it is in the active class, and is subject to a first set of fuzzy rules. When the actuator is positioned between 0 and 7.5, or between 192.5 and 200, it is in the end stroke class, and is subject to a second set of fuzzy rules. Note that the active and end stroke classes are overlapping between 5 and 7.5 and between 192.5 and 195. When the actuator is positioned in this overlapping region, it is subject to both sets of fuzzy rules on a pro rata basis, as explained further below.

The end stroke classes are themselves divided into subclasses, with each subclass having an additional fuzzy rule associated therewith. A subclass identified as negative big (NBig) extends from 0 to 5, and a subclass identified as positive big (PBig) extends from 195 to 200. A subclass identified as negative medium (NMed) extends from 2.5 to 7.5, and a subclass identified as positive medium (PMed) extends from 192.5 to 197.5. Tables 1 and 2 list the fuzzy rules applied when the actuator is positioned in the active and end stroke classes, respectively, where "cpos" stands for current actuator position, "dpos" stands for the difference between the position command from the motion controller (the target position) and the current actuator position, "spd" stands for actuator motor speed, and "moToq" stands for actuator motor torque.

Figure 11:
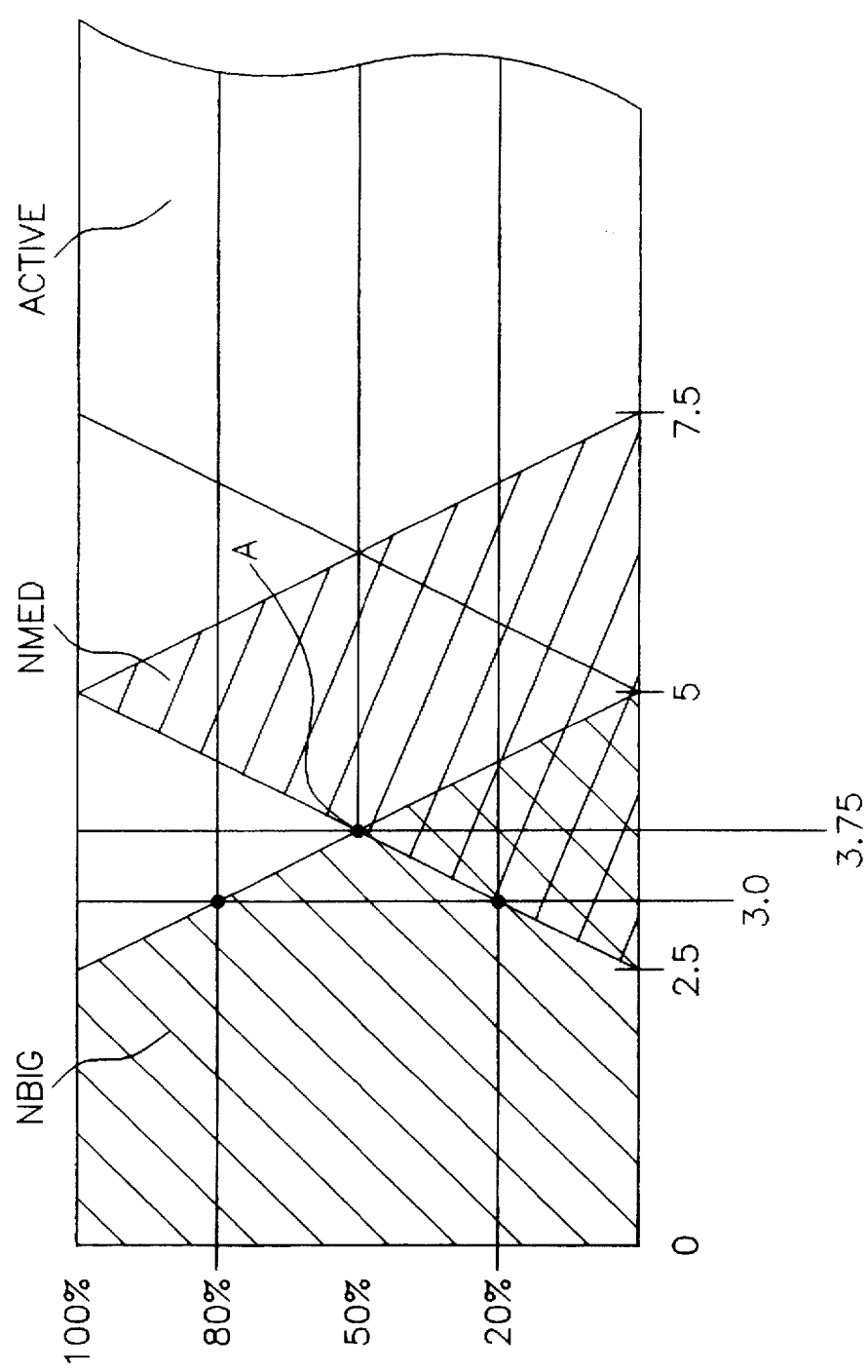
FIG. 11 is an enlarged view of the encircled portion of FIG. 10 illustrating the allocation of the fuzzy rules for overlapping classes.
Figure 12:
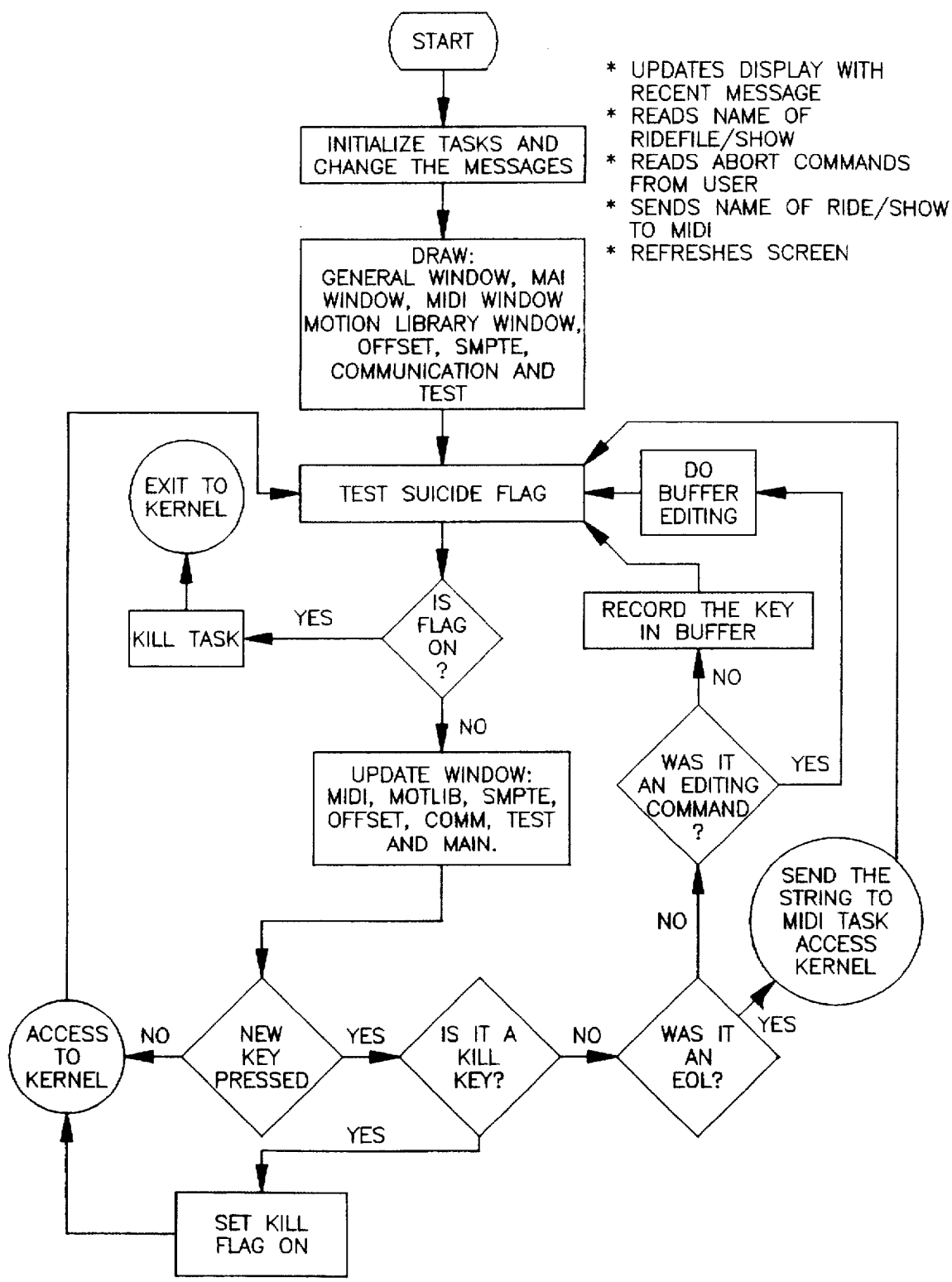
FIGS. 12–18 are detailed flowcharts of the motion controller software for performing the operations illustrated in FIG. 6.
Figure 13:
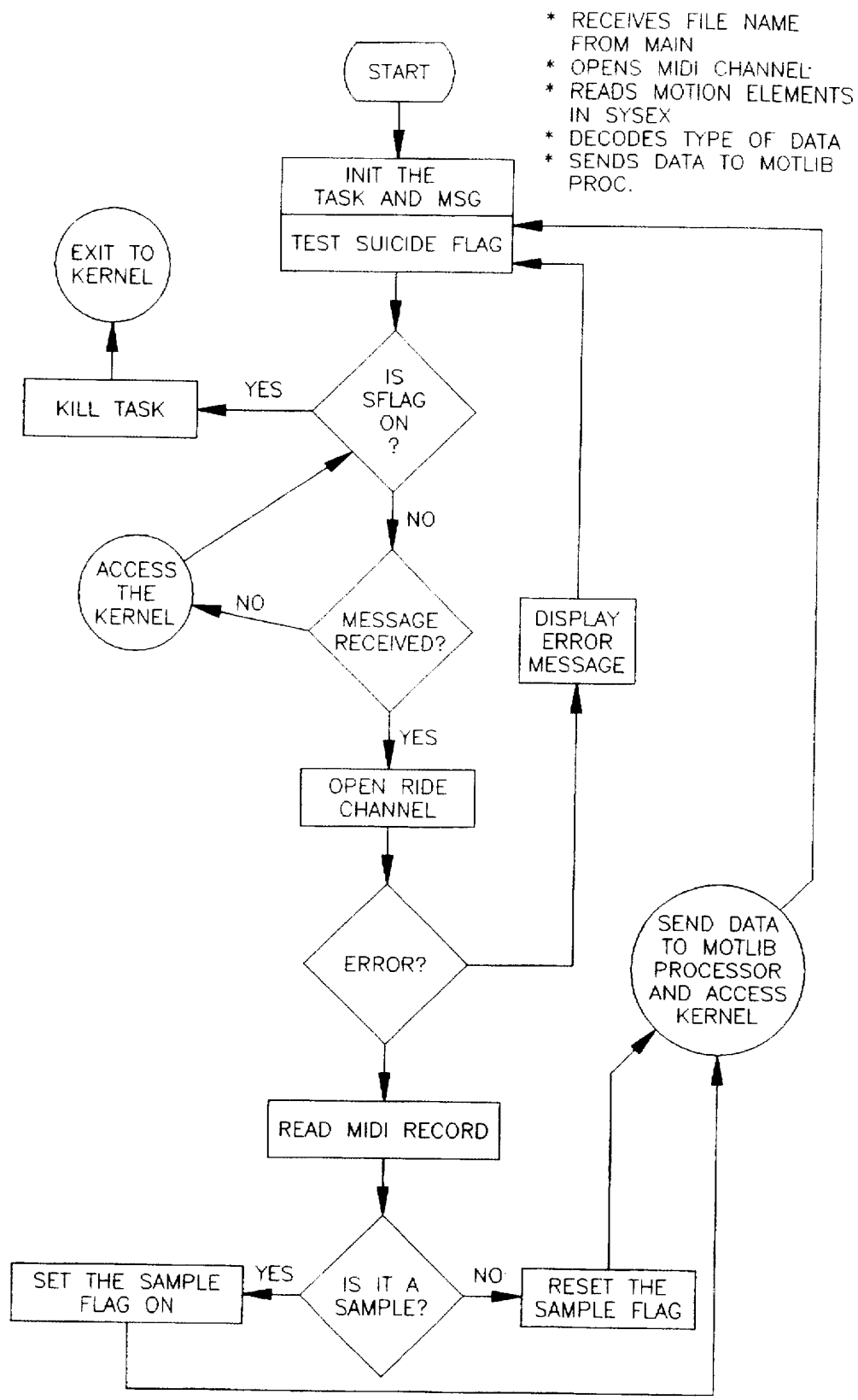
Figure 14:
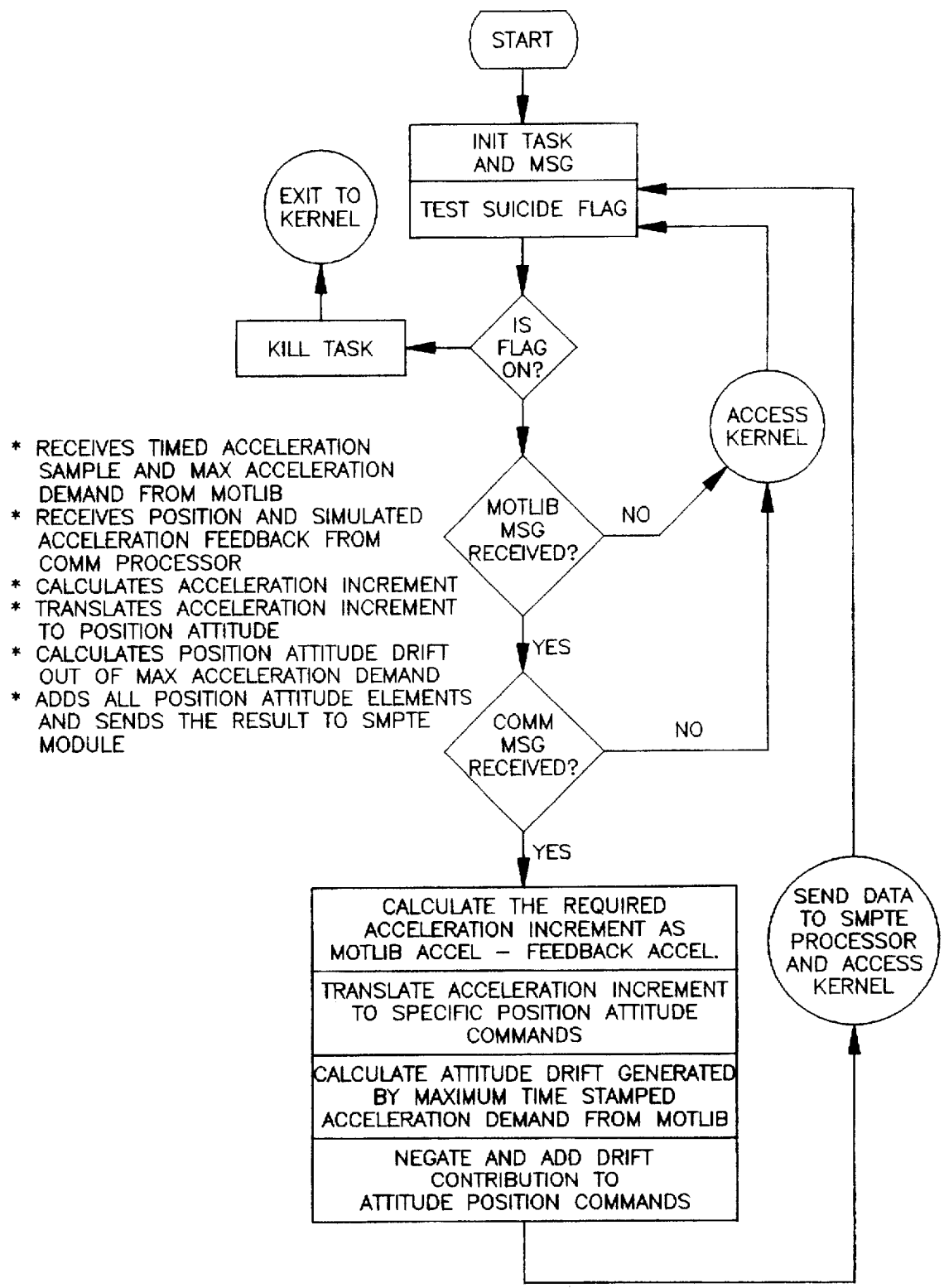
Figure 15:
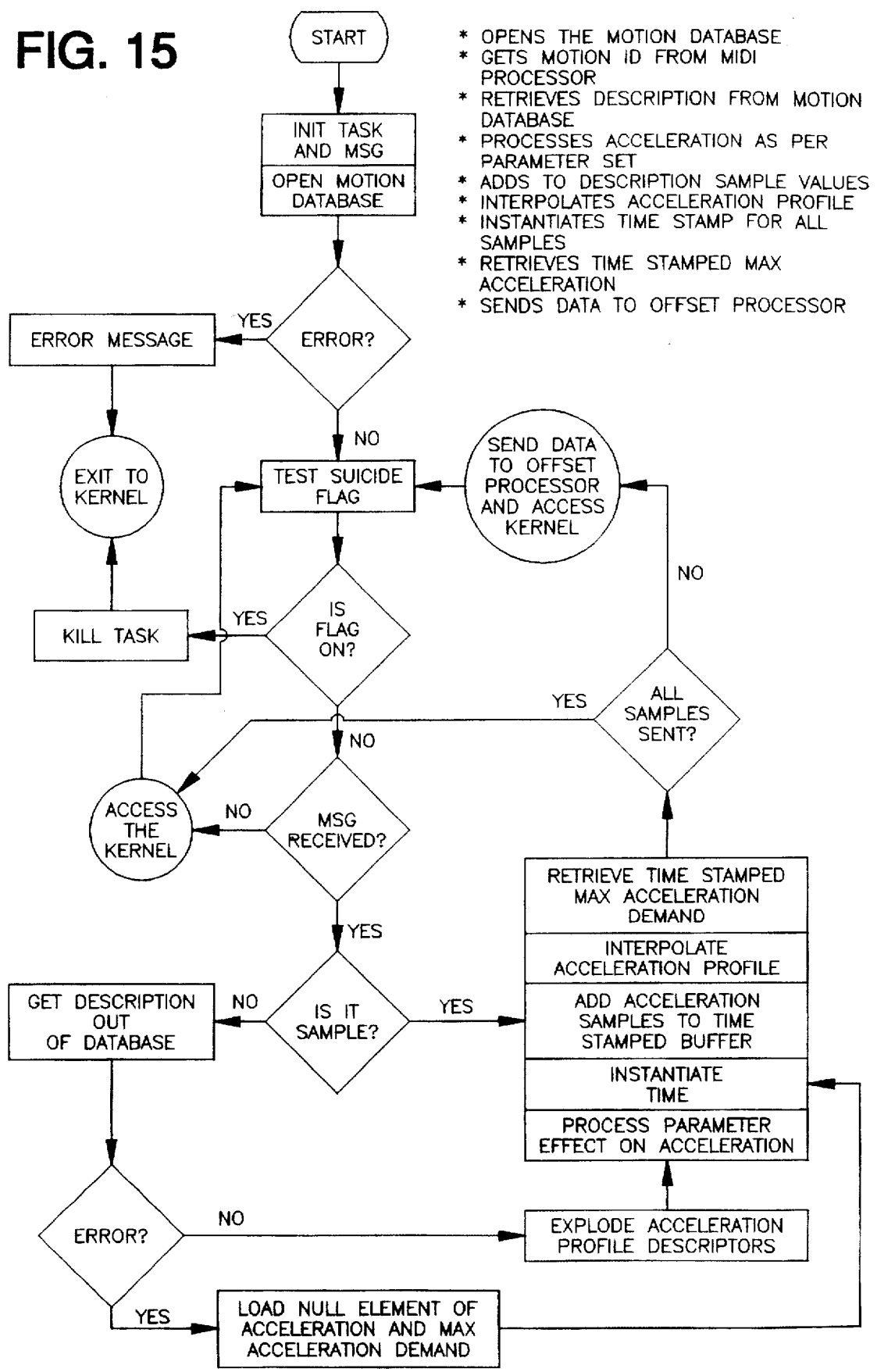
Figure 16:
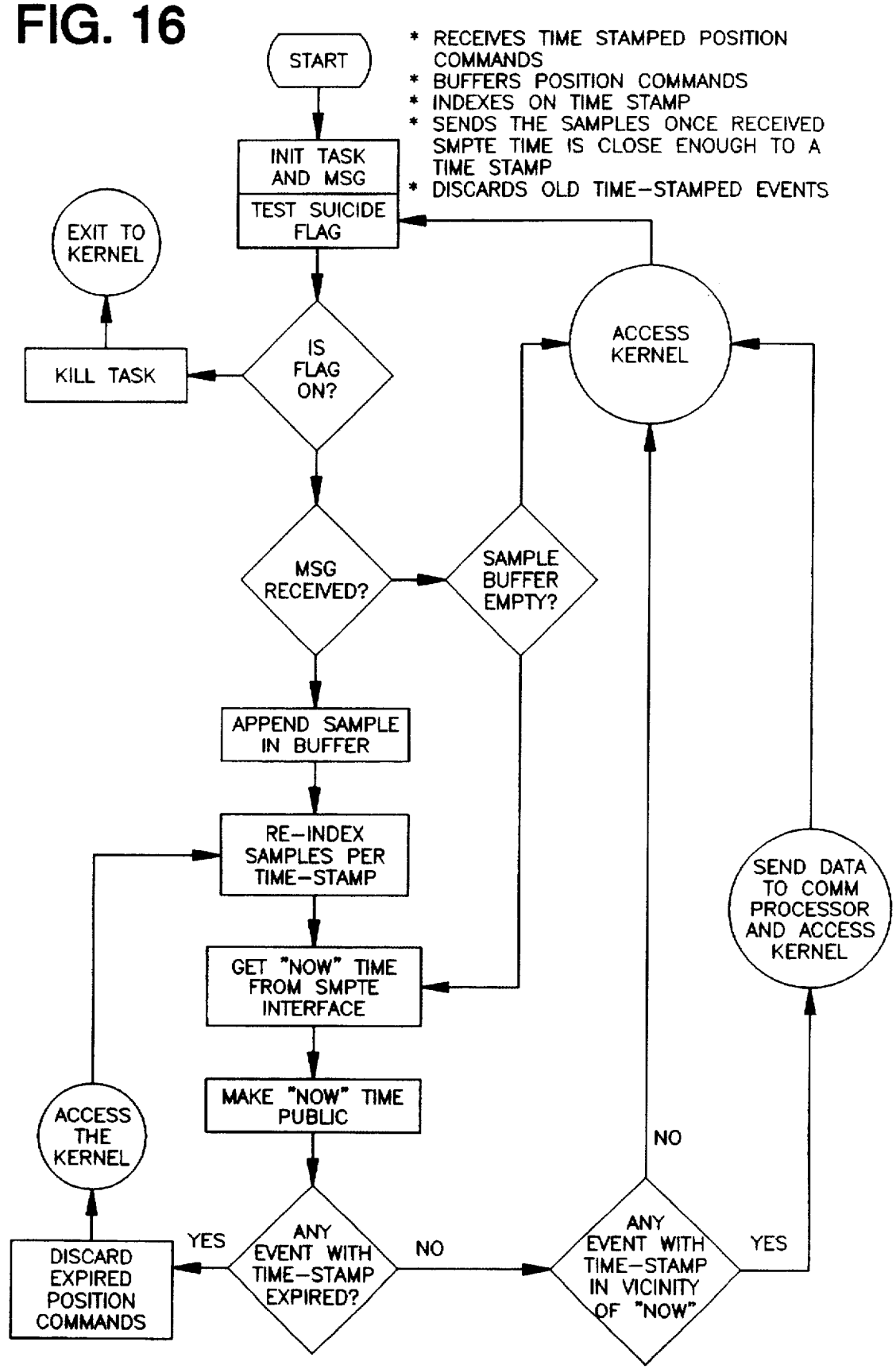
Figure 17:
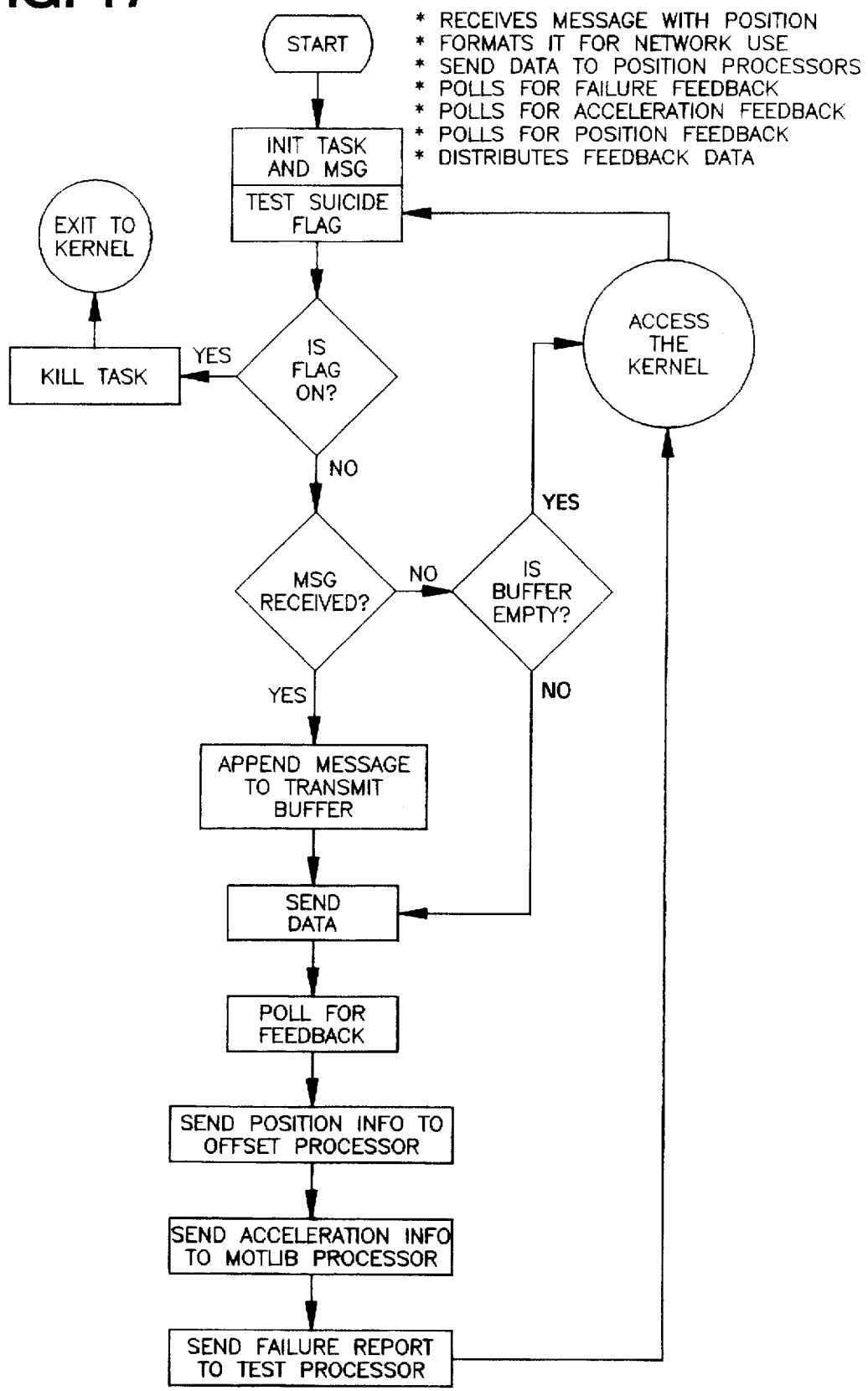
Figure 18:
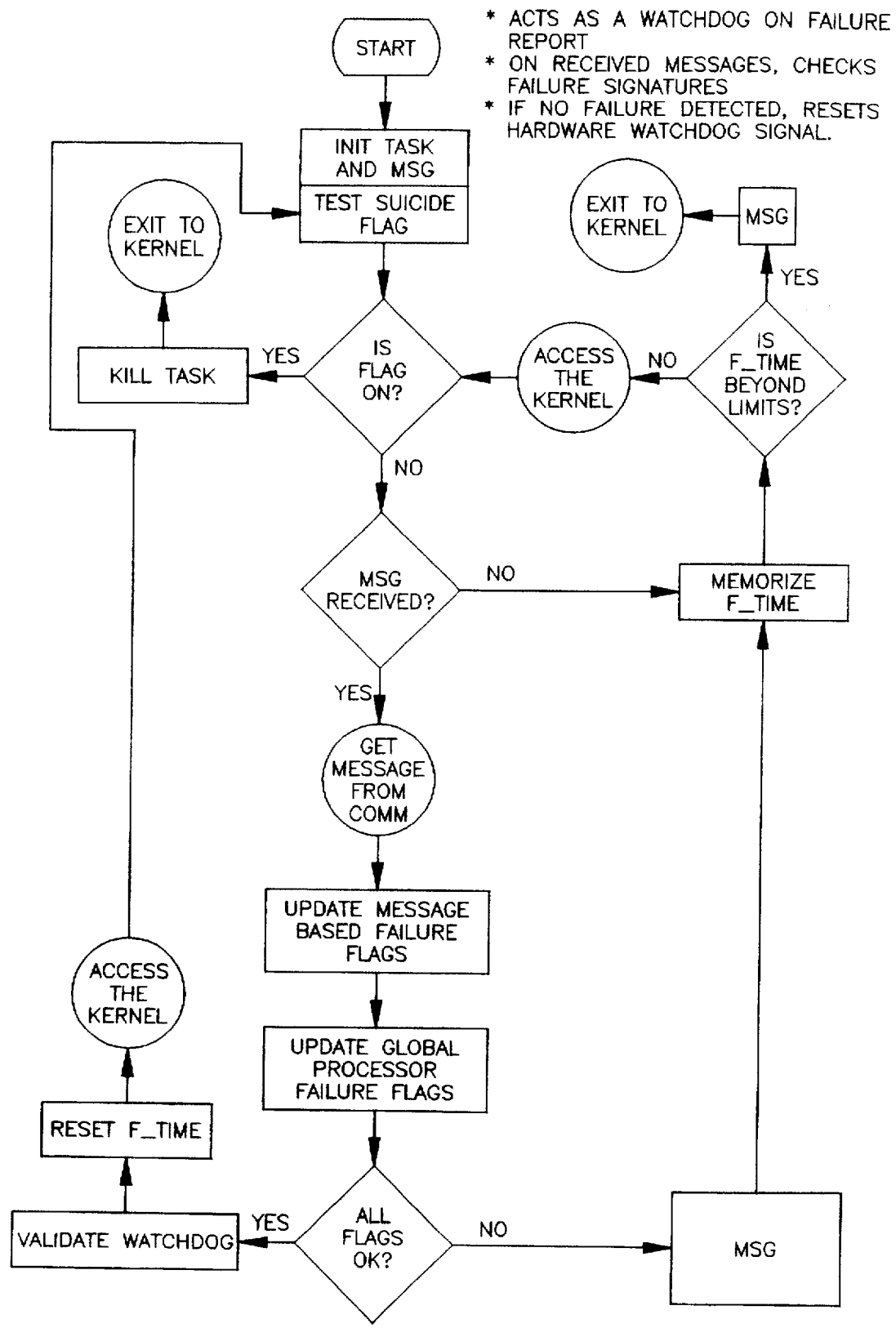
Figure 19:
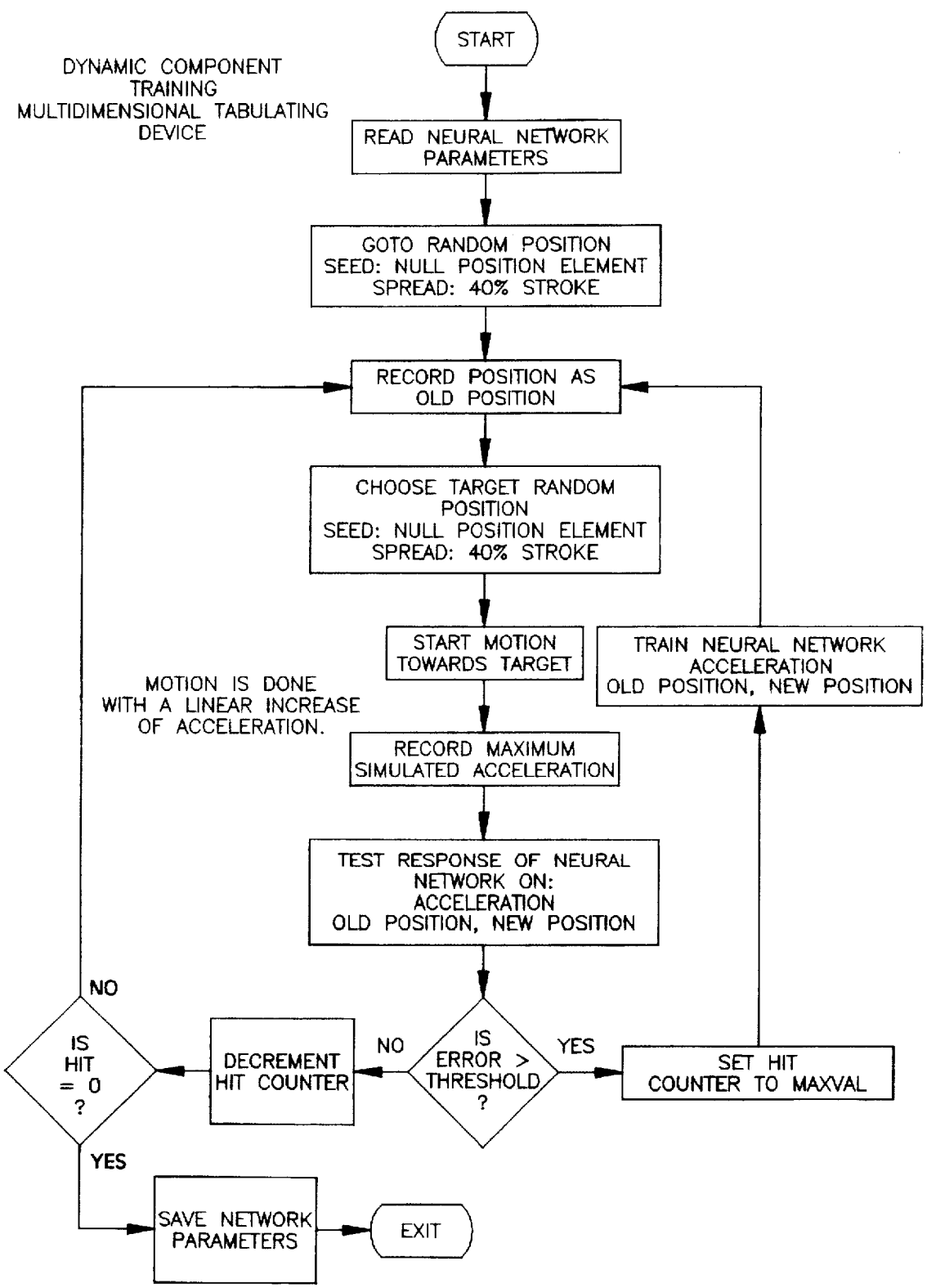
FIGS. 19–20 are detailed flowcharts for the motion controller software required for performing the training process for the multi-dimensional tabulating device.
Figure 20:
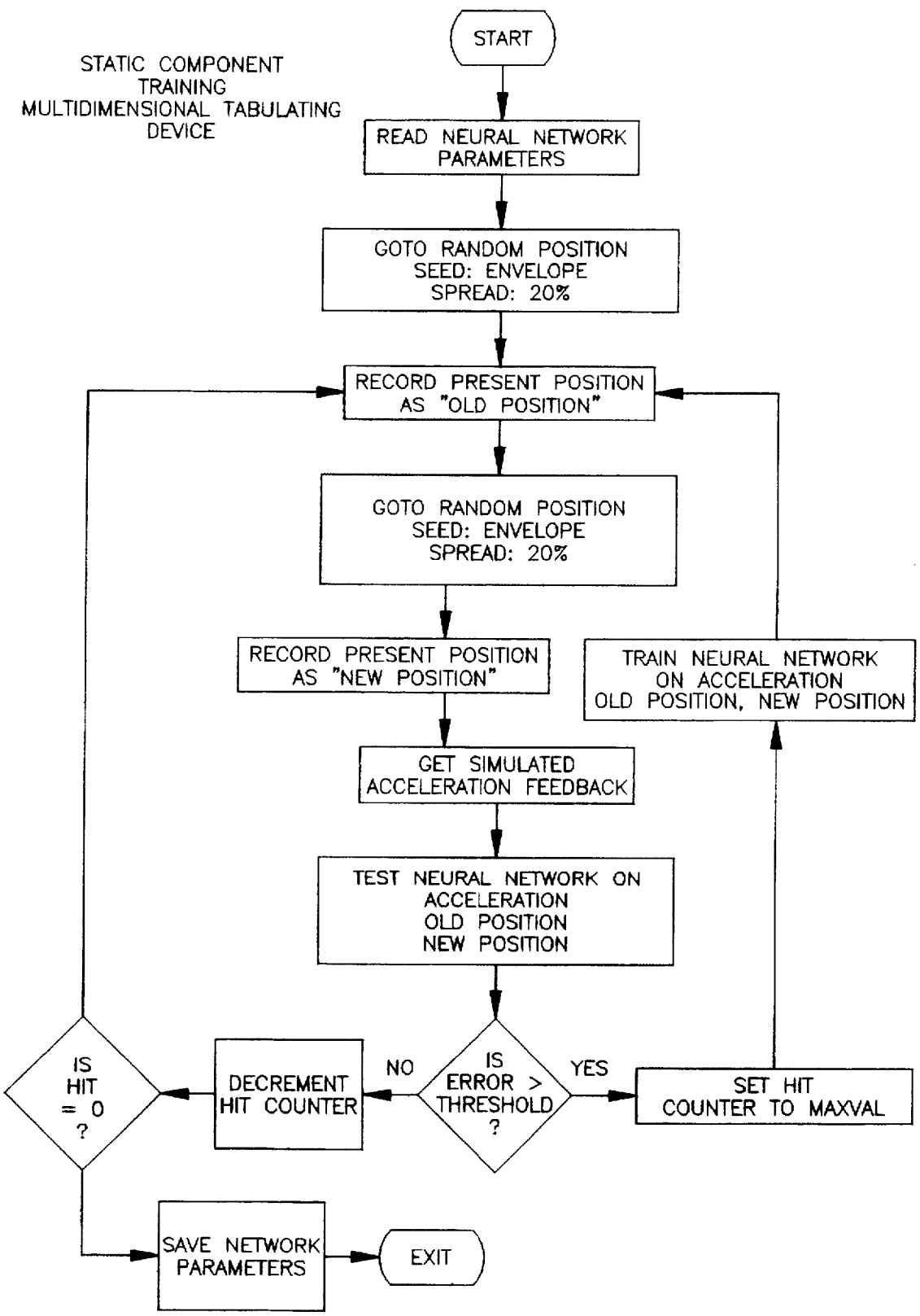

TABLE 1—FUZZY RULES FOR ACTIVE CLASS if dpos is NBigDiff and spd is ZeroS and cpos is active then moToq is NBig;
if dpos is NMedDiff and spd is ZeroS and cpos is active then moToq is NBig;
if dpos is NSmallDiff and spd is ZeroS and cpos is active then moToq is NLow;
if dpos is ZeroDiff and spd is ZeroS and cpos is active then moToq is ZeroVal;
if dpos is PSmallDiff and spd is ZeroS and cpos is active then moToq is PLow;
if dpos is PMedDiff and spd is ZeroS and cpos is active then moToq is PBig;
if dpos is PBigDiff and spd is ZeroS and cpos is active then moToq is PBig;
if dpos is NBigDiff and spd is PMed and cpos is active then moToq is NBig;
if dpos is NMedDiff and spd is PMed and cpos is active then moToq is NBig;
if dpos is NSmallDiff and spd is PMed and cpos is active then moToq is NMed;
if dpos is ZeroDiff and spd is PMed and cpos is active then moToq is NLow;
if dpos is PSmallDiff and spd is PMed and cpos is active then moToq is ZeroVal;
if dpos is PMedDiff and spd is PMed and cpos is active then moToq is PLow;
if dpos is PBigDiff and spd is PMed and cpos is active then moToq is PMed;
if dpos is NBigDiff and spd is PBig and cpos is active then moToq is NBig;
if dpos is NMedDiff and spd is PBig and cpos is active then moToq is NBig;
if dpos is NSmallDiff and spd is PBig and cpos is active then moToq is NBig;
if dpos is ZeroDiff and spd is PBig and cpos is active then moToq is NMed;
if dpos is PSmallDiff and spd is PBig and cpos is active then moToq is NLow;
if dpos is PMedDiff and spd is PBig and cpos is active then moToq is ZeroVal;
if dpos is PBigDiff and spd is PBig and cpos is active then moToq is PBig;
if dpos is NBigDiff and spd is NMed and cpos is active then moToq is NBig;
if dpos is NMedDiff and spd is NMed and cpos is active then moToq is NMed;
if dpos is NSmallDiff and spd is NMed and cpos is active then moToq is ZeroVal;
if dpos is ZeroDiff and spd is NMed and cpos is active then moToq is PMed;
if dpos is PSmallDiff and spd is NMed and cpos is active then moToq is PBig;
if dpos is PMedDiff and spd is NMed and cpos is active then moToq is PBig;
if dpos is PBigDiff and spd is NMed and cpos is active then moToq is PBig;
if dpos is NBigDiff and spd is NBig and cpos is active then moToq is NBig;
if dpos is NMedDiff and spd is NBig and cpos is active then moToq is NLow;
if dpos is NSmallDiff and spd is NBig and cpos is active then moToq is PLow;
if dpos is ZeroDiff and spd is NBig and cpos is active then moToq is PMed;
if dpos is PSmallDiff and spd is NBig and cpos is active then moToq is PBig;
if dpos is PMedDiff and spd is NBig and cpos is active then moToq is PBig;
if dpos is PBigDiff and spd is NBig and cpos is active then moToq is PBig;

TABLE 2—FUZZY RULES FOR END STROKE CLASS if cpos is PBig then moToq is NBig;
if cpos is PMed then moToq is NLow;
if cpos is NMed then moToq is PLow;
if cpos is NBig then moToq is PBig;

FIG. 11 provides an enlarged view of the negative end stroke class and illustrates how overlapping fuzzy classes have their corresponding rules applied on a pro rata basis. If the actuator is positioned at 3.75, then it is in the NBig subclass as well as the NMed subclass. By striking a vertical line at the 3.75 position, the line will intersect the boundaries for both subclasses at point "A". By striking a horizontal line through point "A", the horizontal line will cross the leftmost vertical axis at a point labeled as 50%. Thus, when the actuator is located at 3.75, the position processor will apply 50% of the result of the fuzzy rule for subclass NBig, and 50% of the result of the fuzzy rule for subclass NMed. For example, if the rule for NBig is that moToq is set to four amps, and the rule for NMed is that moToq is set to two amps, then the moToq for the actuator position of 3.75 would be set to three amps.

As a second example, if the actuator is positioned at 3.0, then the position processor will apply 20% of the fuzzy rule for subclass NMed, and 80% of the fuzzy rule for subclass NBig. Hence, as the actuator moves closer to the 0 position, the actuator motor torque is gradually increased to drive the actuator back into the active class. By the time the actuator reaches the position of 2.5, 100% of the fuzzy rule for subclass NBig is applied, which equates to setting the value of the motor torque as high as possible and in the opposite direction from the end stroke class. In this manner, fuzzy logic programming is utilized to prevent the actuator from experiencing its mechanical limitations, which in turn prevents a participant of the motion platform from experiencing abrupt and unintended decelerations.

There are various changes and modifications which may be made to the invention as would be apparent to those skilled in the art. However, these changes or modifications are included in the teaching of the disclosure, and it is intended that the invention be limited only by the scope of the claims appended hereto, and their equivalents.

What is claimed is:

1. A motion controller for providing control information to a virtual motion platform, said controller including an input for receiving a generic motion description, said controller being configured for translating the generic motion description into commands for controlling movement of said motion platform.

2. The controller of claim 1 wherein said motion platform has limited motion capabilities and said controller is configured for translating the generic motion description into commands for controlling movement of said motion platform within its limited motion capabilities.

3. The controller of claim 2 further configured with artificial intelligence to determine the limited motion capabilities of said motion platform.

4. The controller of claim 1 wherein the input of said controller is a serial input and the generic motion description is formatted according to a MIDI communication standard.

5. The controller of claim 1 wherein said controller includes a translation table for translating the generic motion description into acceleration profiles.

6. The controller of claim 5 wherein said controller includes an input for receiving simulated acceleration feedback signals from said motion platform, said controller being configured for determining differences between said feedback signals and said acceleration profiles, and for translating said differences into said commands.

7. The controller of claim 5 wherein said motion platform has multiple DOF and at least one actuator for each DOF, said controller including an offset processor for identifying a future acceleration profile that requires large actuator movement, and for augmenting the commands to position said motion platform for simulation of the identified acceleration profile.

8. The controller of claim 5 wherein said controller includes means for editing said translation table.

9. The controller of claim 1 further configured for translating the generic motion description into acceleration profiles for an ideal motion platform having six DOF and unlimited mechanical movement.

10. A computer readable memory device for a simulated motion control system having a motion platform, said memory device being configured for translating a generic motion description into commands for controlling movement of said motion platform.

11. The device of claim 10 wherein said motion platform has limited motion capabilities and said memory device is configured for translating the generic motion description into commands for controlling movement of said motion platform within its limited motion capabilities.

12. The device of claim 11 wherein said memory device includes artificial intelligence for determining the limited motion capabilities of said motion platform.

13. The device of claim 10 wherein said memory device is configured for translating a generic motion description formatted according to a MIDI communication standard into said commands.

14. The device of claim 10 wherein said memory device includes a translation table for translating the generic motion description into acceleration profiles.

15. The device of claim 14 further configured for determining differences between said acceleration profiles and simulated acceleration feedback signals from said motion platform, and for translating said differences into said commands.

16. The device of claim 14 wherein said motion platform has multiple DOF and at least one actuator for each DOF, said memory device being configured for identifying a future acceleration profile that requires large actuator movement, and for augmenting said commands to position said motion platform for simulation of the identified acceleration profile.

17. The device of claim 14 wherein said memory device includes means for editing said translation table.

18. The device of claim 10 further configured for translating the generic motion description into acceleration profiles for an ideal motion platform having six DOF and unlimited mechanical movement.

19. The device of claim 10 wherein said memory device includes means for editing the generic motion description.

20. A motion controller for providing control information to a motion platform, said controller being configured for translating ideal acceleration profiles into commands for controlling movement of said motion platform.

21. The controller of claim 20 further configured for augmenting said commands so as to position said motion platform for future simulation of ideal acceleration profiles.

22. The controller of claim 20 wherein said motion platform has limited capabilities and said controller is configured for translating said ideal acceleration profiles into commands that fall within the limited capabilities of said motion platform.

23. The controller of claim 22 further configured with artificial intelligence to learn the limited capabilities of said motion platform.

24. The controller of claim 20 wherein said controller includes an input for receiving simulated acceleration feedback signals from said motion platform, said controller being configured for determining differences between said feedback signals and said ideal acceleration profiles, and for translating said differences into said commands.

25. The controller of claim 20 wherein said controller includes an input for receiving a generic motion description formatted according to a MIDI communication standard.

26. The controller of claim 25 further configured for translating said generic motion description into said ideal acceleration profiles.

27. The controller of claim 26 wherein said generic motion description includes generic motion identifiers and modifiers, said controller including a translation table for expanding said generic motion identifiers into generic acceleration profiles, and a profile processor for processing said generic acceleration profiles with said modifiers to generate said ideal acceleration profiles.

28. The controller of claim 27 further configured for editing said acceleration profiles.

29. A computer readable memory device for a simulated motion control system having a motion platform, said memory device being configured for translating ideal acceleration profiles into commands for controlling movement of said motion platform.

30. The device of claim 29 wherein said acceleration profiles include relative time stamps and said memory device is configured for converting said relative time stamps into absolute time stamps.

31. The device of claim 29 further configured for augmenting said commands so as to position said motion platform for future simulation of ideal acceleration profiles.

32. The device of claim 29 wherein said motion platform has limited capabilities, said memory device being configured for translating said ideal acceleration profiles into commands for controlling movement of said motion platform within its limited capabilities.

33. The device of claim 32 further configured with artificial intelligence to learn the limited capabilities of said motion platform.

21

34. The device of claim 29 further configured for determining differences between said ideal acceleration profiles and simulated acceleration feedback signals from said motion platform, and for translating said differences into said commands.

35. The device of claim 29 further configured for translating a generic motion description into said ideal acceleration profiles.

36. The device of claim 35 wherein said generic motion description includes generic motion identifiers and modifiers, said memory device including a translation table for expanding said generic motion identifiers into generic acceleration profiles, and a profile processor for processing said generic acceleration profiles with said modifiers to generate said ideal acceleration profiles.

37. The device of claim 36 further configured for editing said acceleration profiles.

38. A controller for a simulated motion platform having limited motion capabilities, said controller having artificial intelligence for learning the limited motion capabilities of said motion platform.

39. The controller of claim 38 configured for translating acceleration profiles into commands for controlling movement of said motion platform.

40. The controller of claim 39 including an input for receiving simulated acceleration feedback signals from said motion platform.

41. The controller of claim 40 wherein each acceleration profile includes components for multiple DOF and said motion platform has less than said multiple DOF, said controller being further configured for simulating said acceleration profiles with said motion platform to a fullest extent possible.

42. The controller of claim 41 further configured for combining movement of said motion platform with respect to at least two DOF to simulate an acceleration component in a DOF that said motion platform does not have.

43. The controller of claim 40 further configured for learning a first movement of said motion platform that simulates a first acceleration, and for extrapolating from said first movement to determine a second movement of said motion platform that simulates a second acceleration.

44. The controller of claim 40 further configured for generating random commands to learn the limited motion capabilities of said motion platform.

45. A computer controller for a simulated motion control system having a motion platform, said controller having means for learning the movement characteristics of said motion platform, means for accepting an input comprised of a plurality of standardized motions, means for translating said standardized motions into a plurality of motions executable by said motion platform, and means for executing said translated motions in said motion platform by controlling its movement.

46. A position processor for an actuator of a motion platform, said processor including an input for receiving commands for controlling movement of said platform and an output for sending control signals to said actuator, said processor being configured for converting said commands into said control signals using fuzzy logic.

47. The processor of claim 46 further configured for using a first set of fuzzy logic rules when said actuator is positioned within a first class and a second set of fuzzy logic rules when said actuator is positioned within a second class.

48. The processor of claim 47 wherein said first and second classes are overlapping.

49. The processor of claim 48 further configured for applying said first and second sets of fuzzy logic rules on a pro rata basis when said actuator is positioned within the overlapping region of said first and second classes.

50. The processor of claim 47 wherein said second set of fuzzy logic rules prevent said actuator from reaching mechanical limits.

51. The processor of claim 50 wherein each fuzzy logic rule of said second set has a corresponding subclass that is within said second class, each subclass overlapping with another of said subclasses.

52. The processor of claim 47 further including an input for receiving current position signals for said actuator.

53. The processor of claim 52 wherein said second set of fuzzy logic rules utilize only the value of said current position signals.

54. The processor of claim 52 further configured for converting said commands into target position signals, and for generating differential position signals from said target position and current position signals, said first set of fuzzy logic rules utilizing the value of said differential position signals.

55. A computer readable memory device for a motion control system, said memory device comprising commands for controlling movement of a motion platform with the aid of a computer, said commands being generated from ideal acceleration profiles.

56. A computer readable memory device for a motion control system, said memory device comprising commands for controlling movement of a motion platform with the aid of a computer, said commands being generated from a generic motion description.

57. A computer readable memory device for directing a computer to function in a particular manner when said memory device is used by said computer, said memory device including a list of generic motion identifiers, means for selecting motion identifiers from said list, and means for arranging the selected motion identifiers in a relative order to thereby create a generic motion description.

58. The device of claim 57 wherein said arranging means includes means for assigning time codes to the selected motion identifiers.

59. The device of claim 58 wherein said assigning means includes means for assigning relative time codes to the selected motion identifiers.

60. The device of claim 57 further including means for formatting the generic motion description according to a MIDI communication standard.

61. The device of claim 57 further including means for assigning modifiers to the selected motion identifiers.

62. The device of claim 61 wherein said modifiers are selected from the group consisting of time, magnitude, direction, frequency, and refinement modifiers.

63. The device of claim 57 further including means for editing the selected motion identifiers to facilitate creation or modification of a ride file.

64. The device of claim 57 further including means for creating a generic motion identifier and means for adding the created motion identifier to said list.

65. The device of claim 57 further including means for adding created motion descriptions to said list.

66. The device of claim 57 wherein said list includes an acceleration profile for each generic motion identifier, said memory device further including means for editing the acceleration profiles.

67. The device of claim 57 further including means for arranging other types of show synchronization commands in a relative order with the selected motion identifiers.

68. A method for creating a generic motion description for use with a simulated motion control system comprising the step of arranging generic motion identifiers in a relative order to thereby create said generic motion description.

69. The method of claim 68 wherein the arranging step includes the step of assigning time codes to the generic motion identifiers.

70. The method of claim 68 further comprising the step of formatting said generic motion description according to a MIDI communication standard.

71. The method of claim 68 further comprising the step of assigning modifiers to the generic motion identifiers.

72. The method of claim 68 further comprising the step of arranging other types of show synchronization commands in a relative order with the generic motion identifiers.

73. A motion controller for controlling a motion platform, said controller having a first input for receiving motion cues, a second input for receiving simulated acceleration feedback signals from said motion platform, and means for utilizing said feedback signals to convert said motion cues into commands for controlling movement of said motion platform.

* * * * *